April 4, 1967 R. E. BELL ETAL 3,312,939
CHECK CIRCUITRY AND APPARATUS
Original Filed March 16, 1960 10 Sheets-Sheet 2
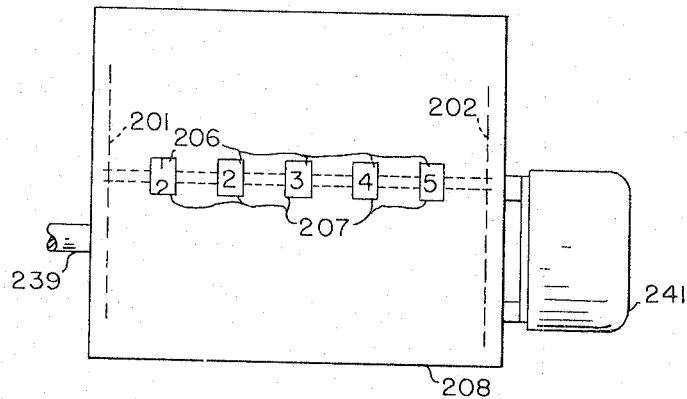
_Fig_V_
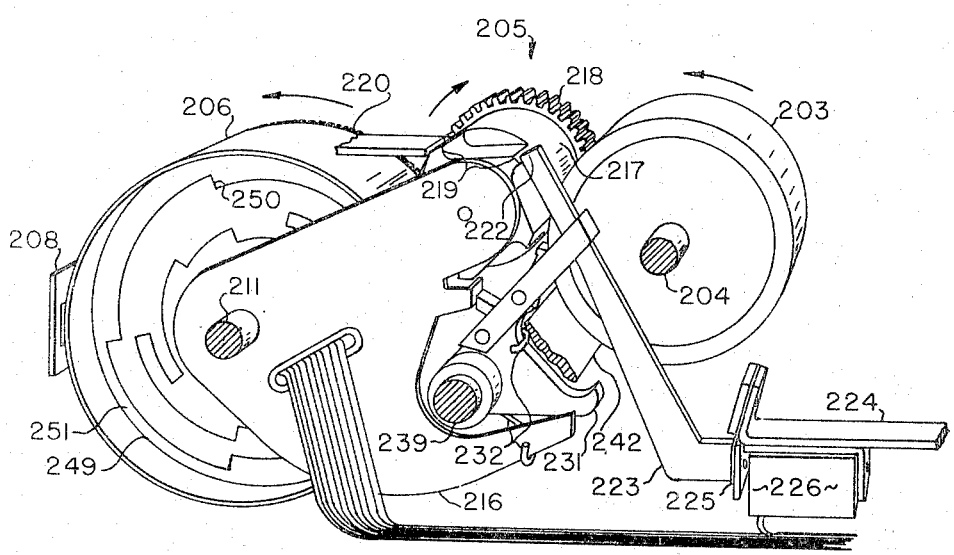
_Fig_VI_
INVENTORS
ROBERT E. BELL
RICHARD C. LOSHBOUGH
BY
Marshall, Marshall & Yeasting
ATTORNEYS

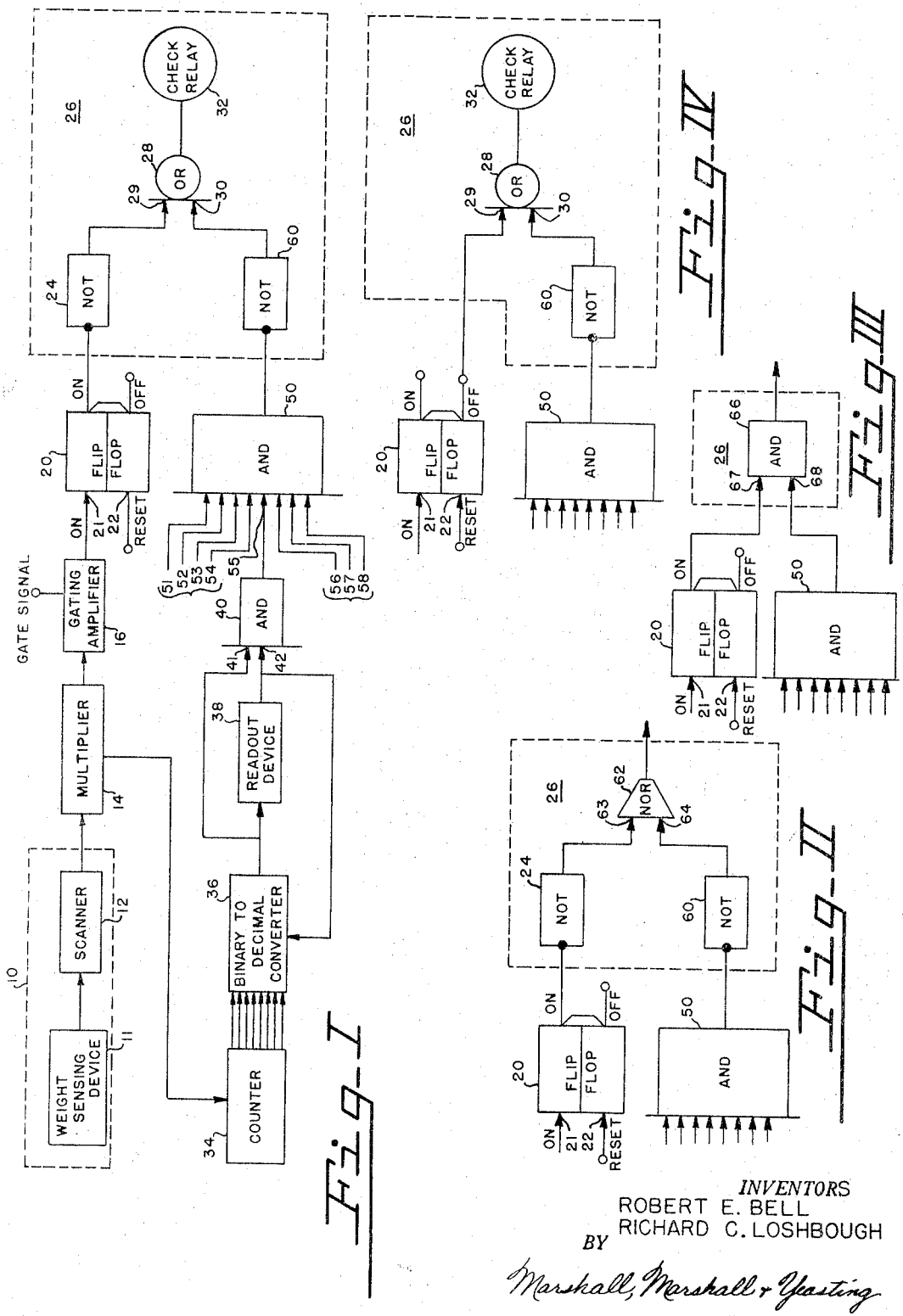

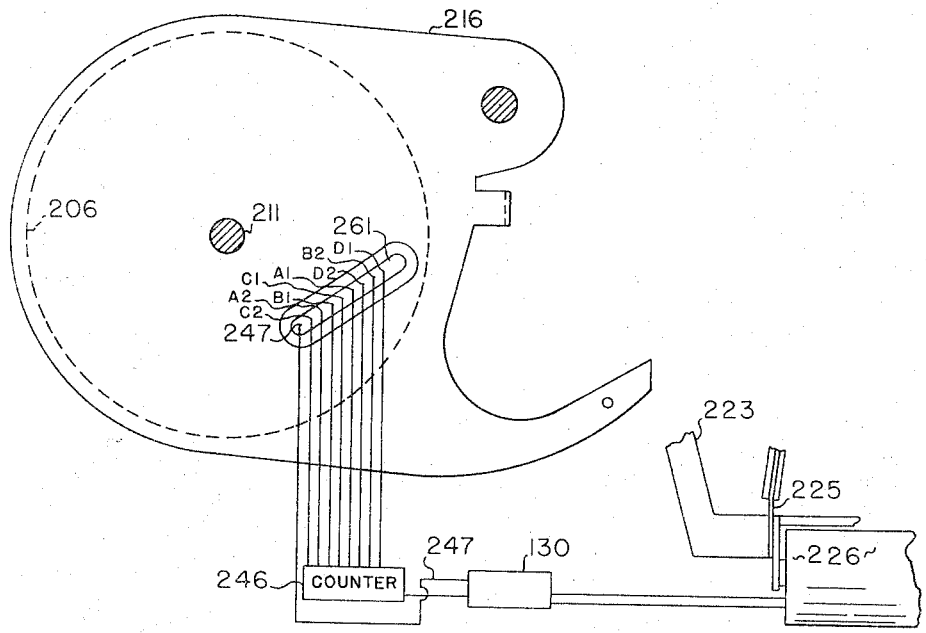
Fig. VII
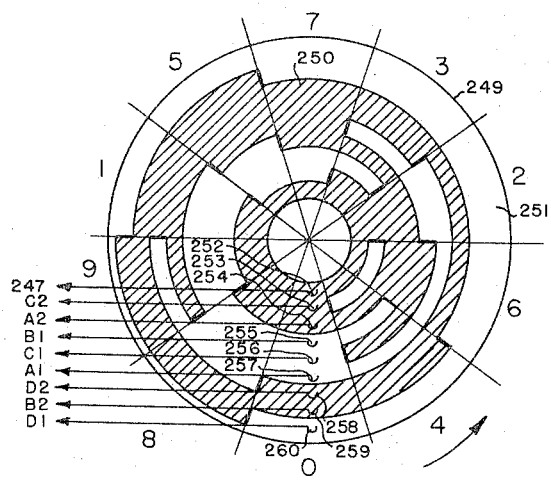
Fig. VIII
INVENTORS
ROBERT E. BELL
RICHARD C. LOSHBOUGH

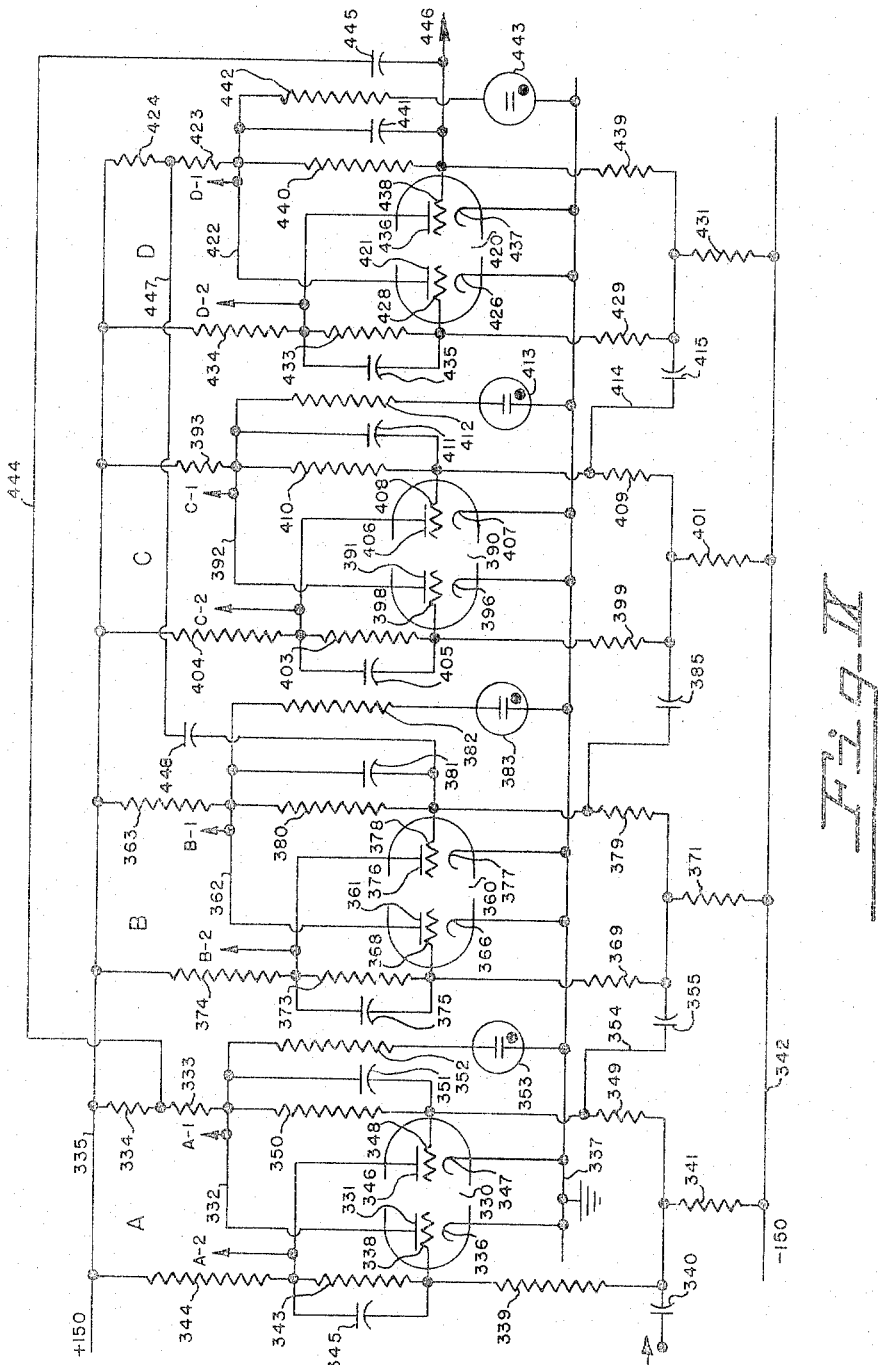

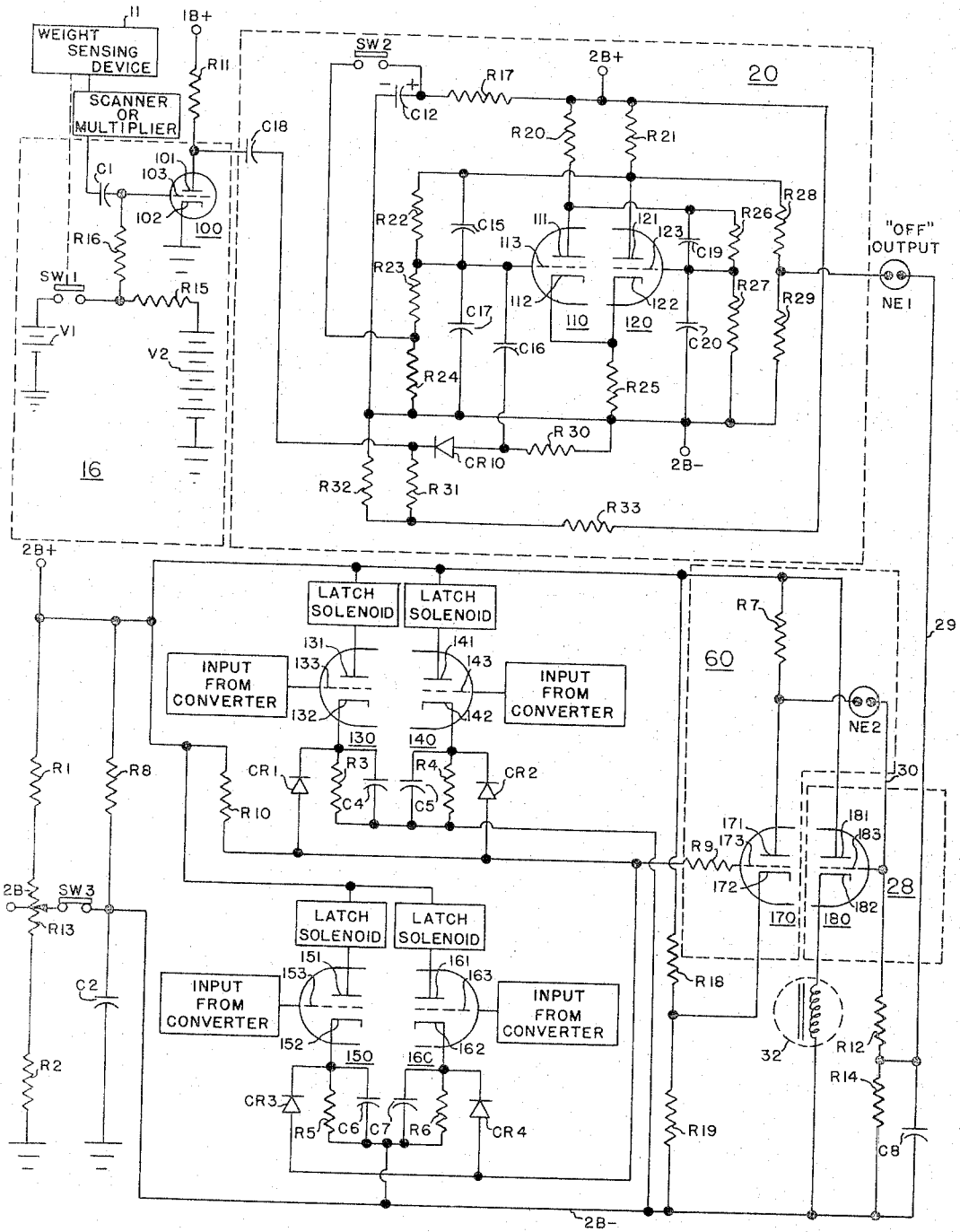
Fig X

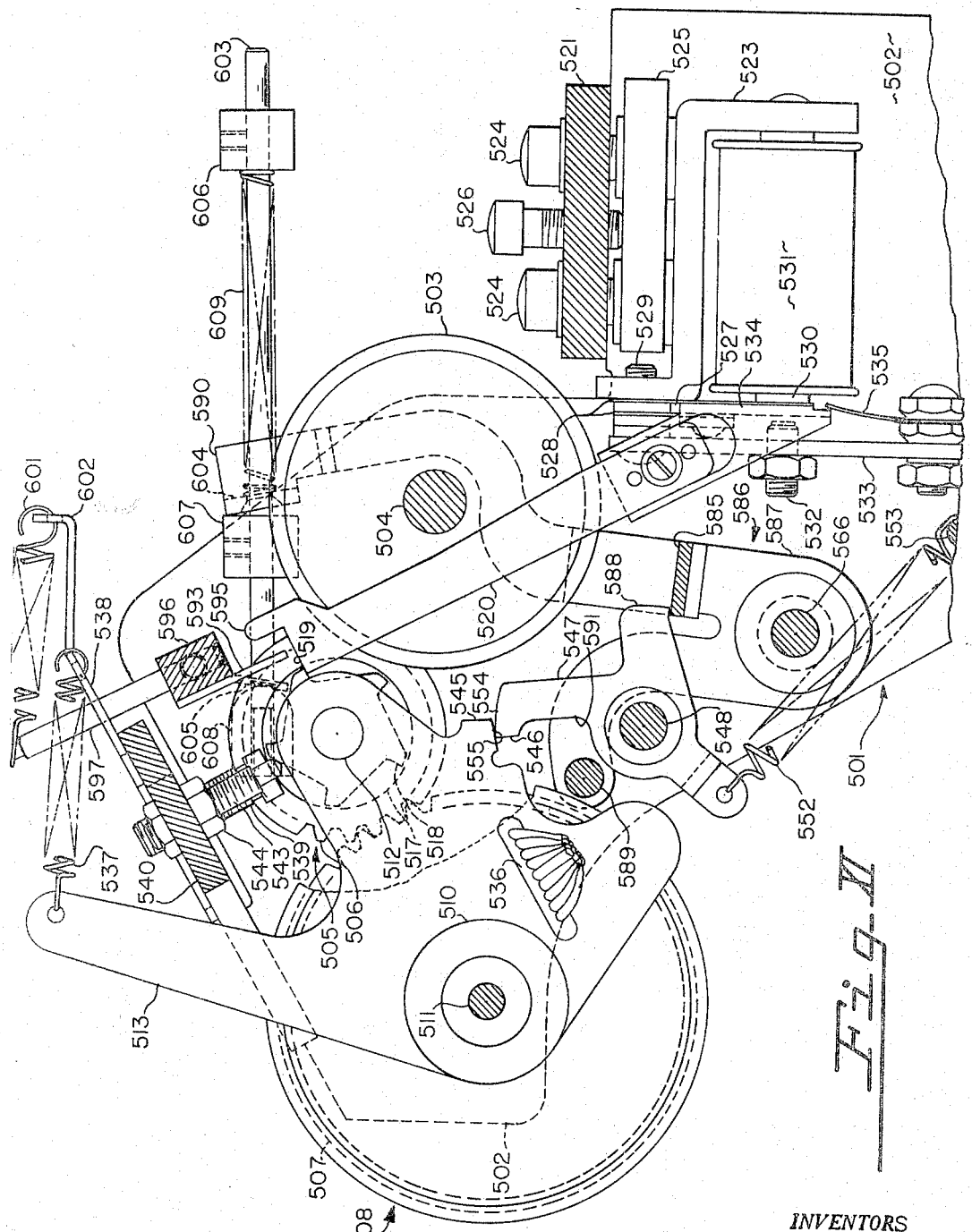

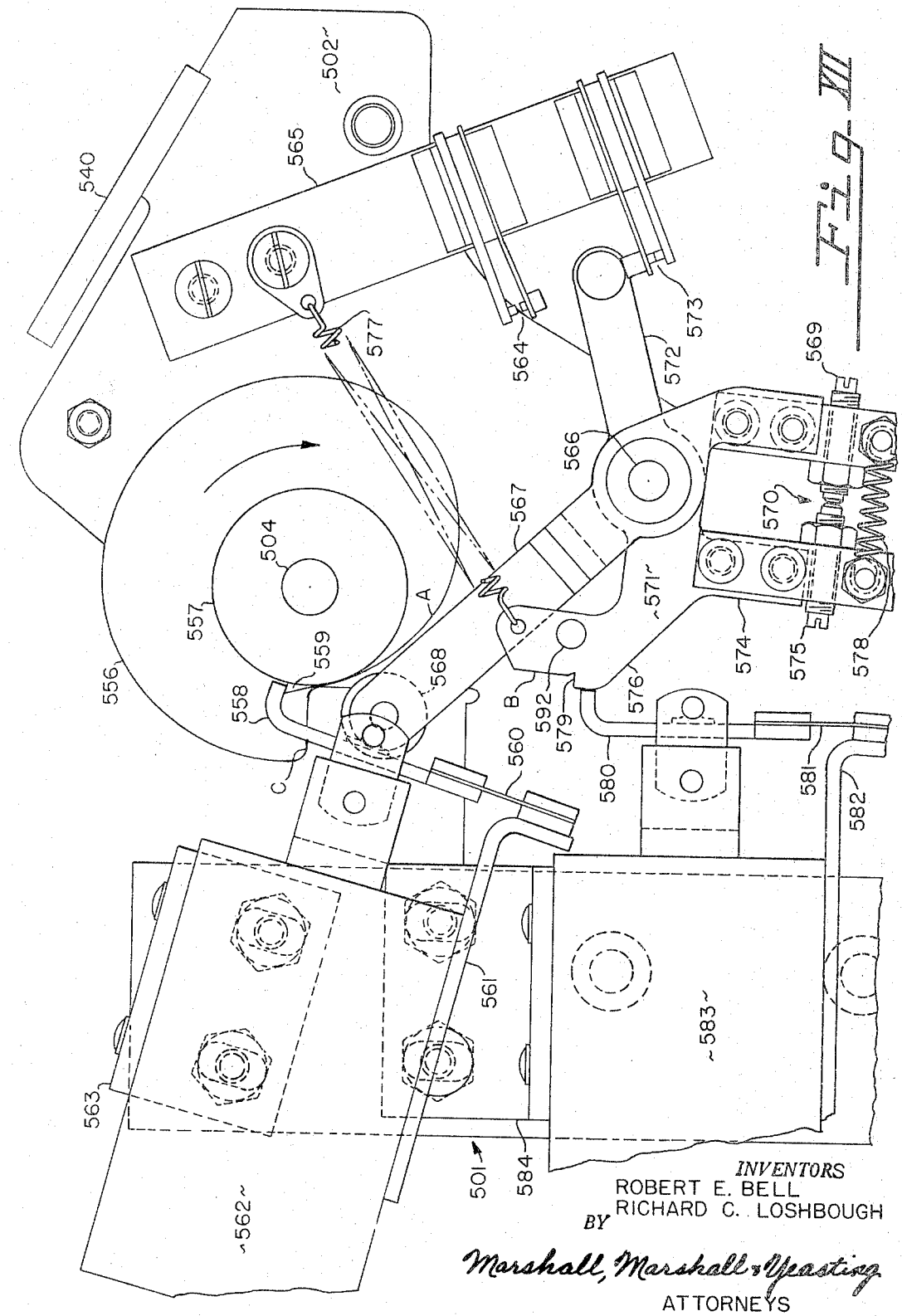

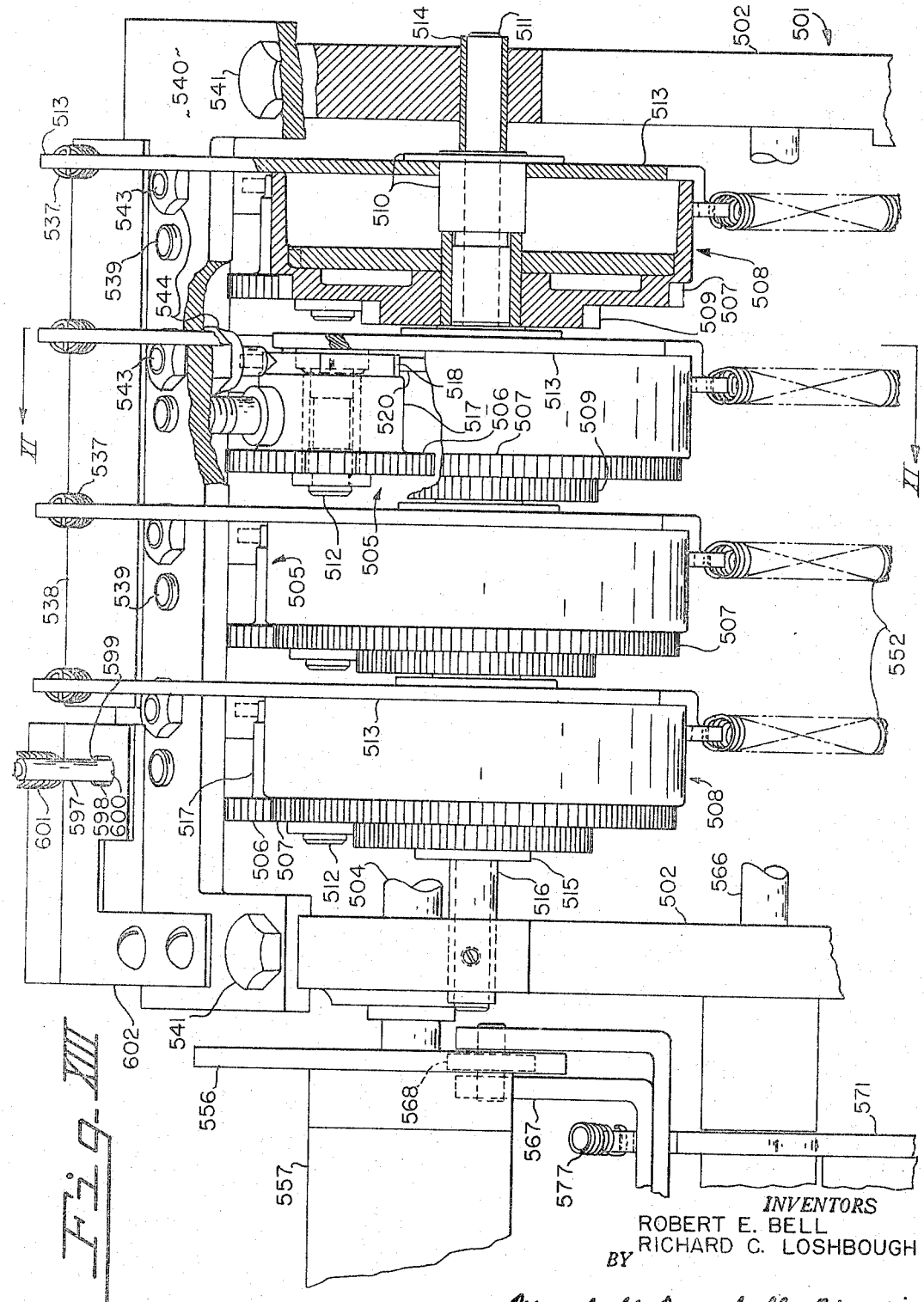

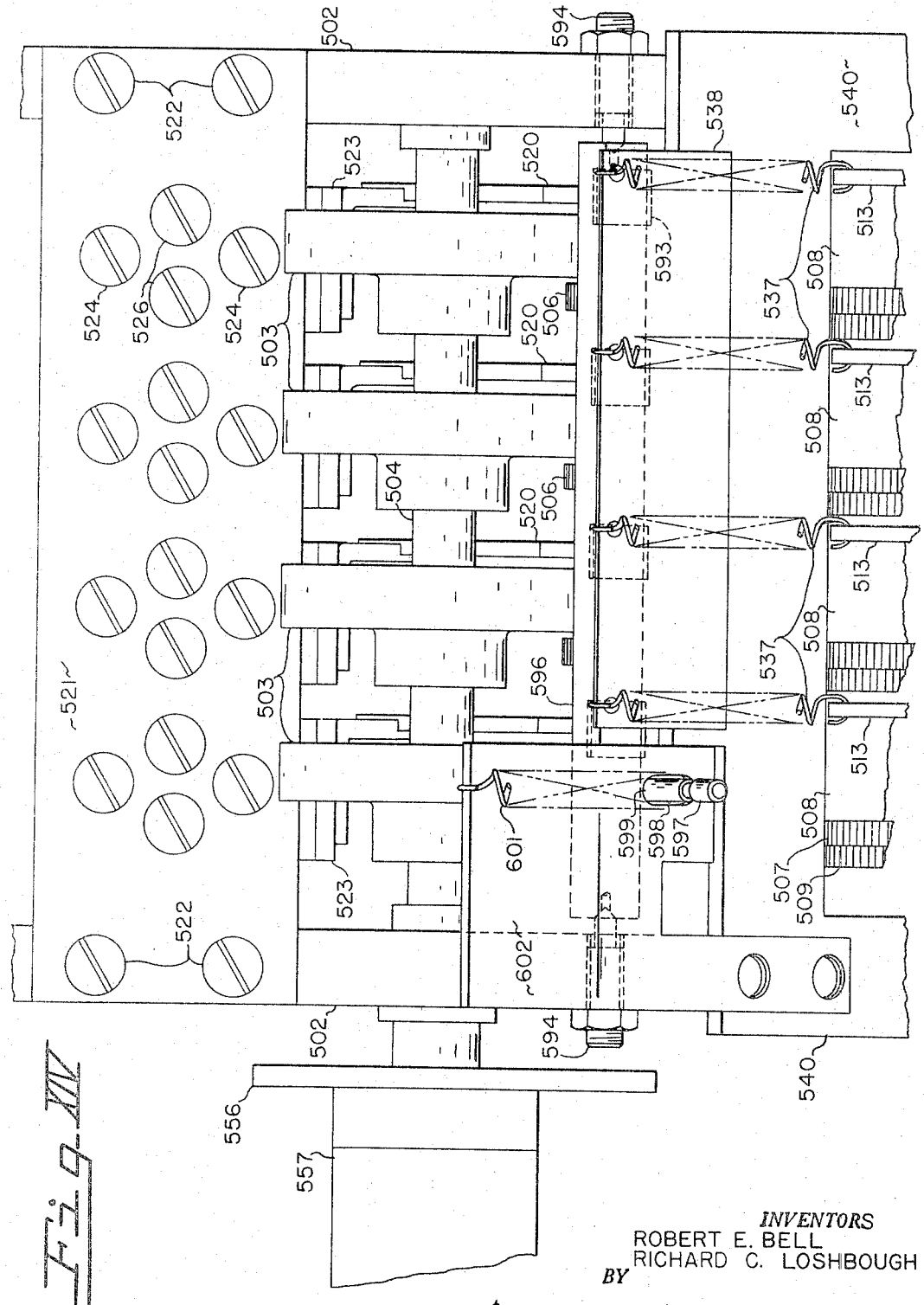

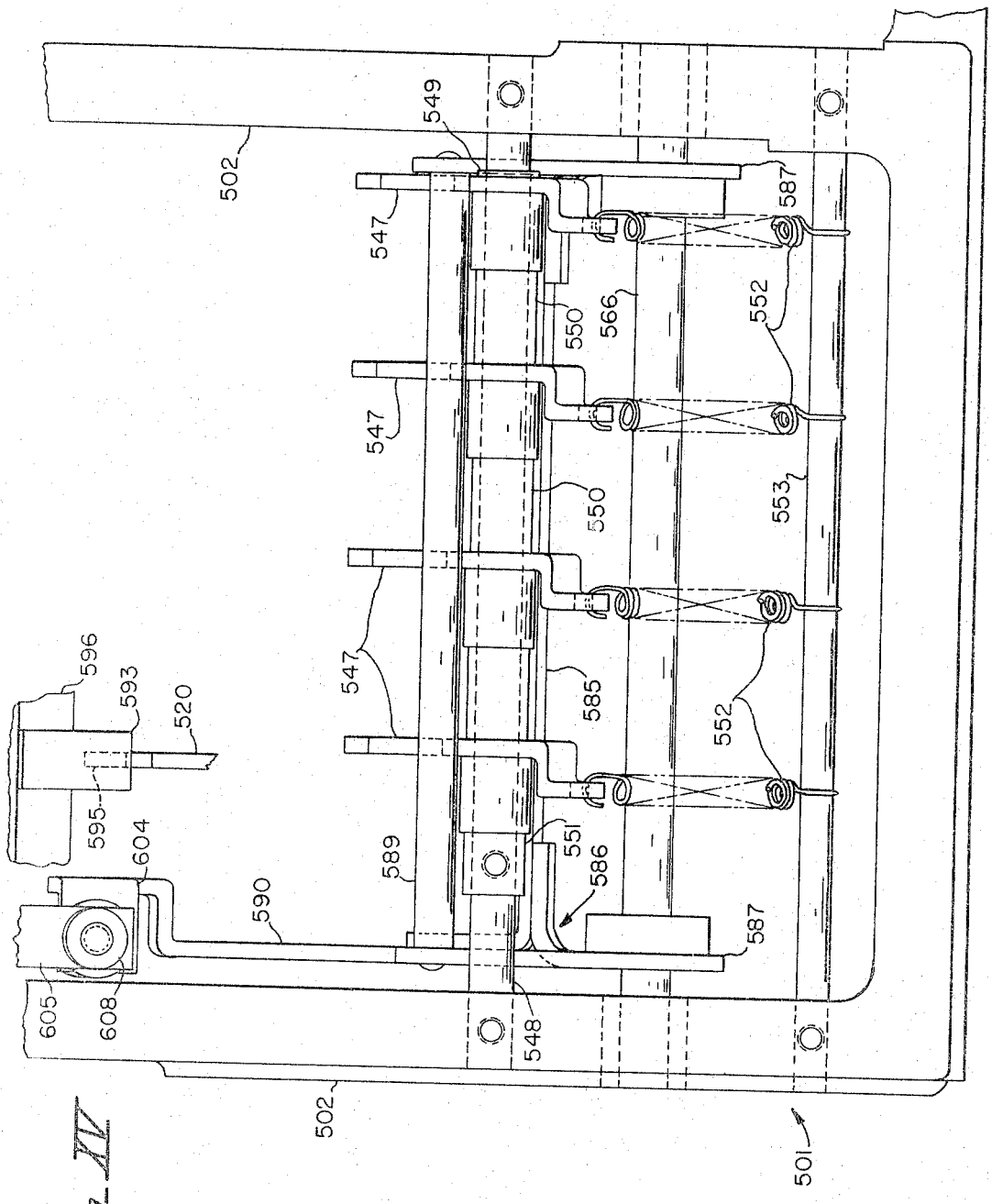

United States Patent Office 3,312,939
Patented Apr. 4, 1967

3,312,939
CHECK CIRCUITRY AND APPARATUS
Robert E. Bell and Richard C. Loshbough, Toledo, Ohio, assignors to Toledo Scale Corporation, Toledo, Ohio, a corporation of Ohio
Continuation of application Ser. No. 15,499, Mar. 16, 1960. This application June 1, 1965, Ser. No. 466,140
7 Claims. (Cl. 340—147)

This invention relates to check circuitry and apparatus and in particular to check circuitry and apparatus utilizing electronic digital and pulse logic circuits.

This application is a continuation of abandoned application Serial No. 15,499 filed March 16, 1960 in the names of Robert E. Bell and Richard C. Loshbough which in turn is a continuation-in-part of abandoned application Serial No. 818,858 filed June 8, 1959 in the names of Robert E. Bell and Richard C. Loshbough.

In the expanding field of electronic control many of the manual and mental manipulations and computations previously performed by an operator are now accomplished through the use of digital and pulse logic circuits and computers. In using a computer, however, information must be initially programmed in a form which may be utilized by the computer before the computations can be made. After the computations are made the finished computations are generally not in a form directly usable by the human operators. Therefore, a field has arisen which covers an area of apparatus generally designated as "readout devices." These readout devices may receive the information from the computer and convert it into indicia that is easily read visually or is "read" by a printing mechanism which transfers the indicia of the readout device to a card, tape, label, or any of a number of other well known forms for recording output information from a readout device.

Although output information from computers is generally in a binary code it is possible on smaller computers or computing machines to have a direct decimal output fed to the readout device, e.g., in an adding machine. In most applications, however, computation within the computer is effected by the use of the binary number system and thus a binary to decimal converter is necessary as a conversion step between the computer and the readout device.

Quite often computers are used directly with some form of a condition responsive device. The condition responsive devices usually generate a series of electrical pulses proportional in number to a condition being measured. It is with this type of computer application that the present invention is employed. Since the condition responsive device is connected directly to the computer there is no human intermediary who insures that the computer is receiving the information. There is again no human intermediary to insure that the output information from the computer to the readout device has properly positioned the readout device, if it is electro-mechanical, or has energized the proper control circuits, if it is an electronic readout device which employs light or other visual indicating means commercially available. It is therefore desirable to have a circuit which checks that the computer is receiving information and that checks to see if the readout device is properly recording output information from the computer and to have apparatus which mechanically checks to see if the readout device is functioning properly.

It is, accordingly, an object of this invention to provide check circuitry and apparatus.

A further object of the invention is to provide an improved check circuit.

Another object of the invention is to provide a check circuit, which insures that at least one pulse has passed from a condition responsive device through an entire computer chain and that all of the control circuits or mechanical positions of a readout device are properly energized or mechanically in place before a readout sequence or a print cycle is initiated, in combination with apparatus which mechanically checks to see if the readout device is functioning properly.

In the specific embodiment of the present invention there is shown a condition responsive device which might be a weight sensing device in combination with a scanner projection lamp, a fixed graduated or calibrated transparent member, an opaque mask covering said transparent member and movable in response to a weight on said weight sensing device and a photo-electric cell, which generates a series of electrical pulses proportional in number to a weight being measured. The generated pulses may then be fed through a preamp and a pulse shaping circuit to a multiplier of the computer. If the weight being measured were that of a marketable product, such as in a food store where the product has a certain price per pound, then this price per pound could be previously set up in the multiplier to give the value of the food product being weighed. The computer in this case could compute or count the weight of the product and also compute or count the value of the product. After the computations are finished it would be desirable to show the computations arrived at for both the weight and value in a visual form, but, particularly in the case of food products, it would be even more desirable to print the weight and the value, as computed, on a label which can be placed in or on the packaged food product. If a printing cycle were to be initiated on the completion of a registration of indicia in the readout device it would also be desirable that the transfer of the information from the computer to the readout device be checked, that at least one of the pulses that had been carried through the multiplier from the condition responsive device had been checked as arriving and that the readout device be checked mechanically to see if it is functioning properly.

Accordingly, a feature of the check circuitry and apparatus of this invention is to check the above operations and prevent initiation of a printing cycle upon the failure of a scanner projection lamp, any electronic device from the preamp to the last multiplier stage, or a lockup of the weight sensing device that would eliminate the signal, and, with no protection, print a label with no computed weight or value. When an electro-mechanical readout device, such as will be described hereinafter, is used the check circuitry and apparatus also prevents initiation of a printing cycle upon failure of a wheel or an indicia bearing rotary drum member to position on a number or indicia corresponding to the state of the controlling decade counter, the failure of said wheel member to properly lockup or the failure of said wheel member to stop rotating which might be caused by an electronic device failure, broken lead or other cause.

Although a readout device embodying strictly electronic circuitry which presents the readout information in lighted numerals or positioned lamps is not shown in this application or other forms of binary to decimal converters are not shown specifically, such as a diode or resistance matrix, it is to be understood that the principles and scope of the present invention are meant to include other forms of the aforementioned devices although they are illustrated only in block diagram form.

According to the invention, the check circuit comprises a condition responsive device adapted to generate a series of electrical pulses proportional in number to a condition being measured. At least one pulse of this series is applied to a Bistable circuit. The entire series of pulses is applied to an electronic counter means and may be applied to said counter means through a multiplier device. A readout means is utilized which is operative to register predetermined indicia in response to a predetermined count of the pulses in the counter means. In response to the coincidence of a predetermined registered indicia of said readout means and an associated predetermined count in said counter means an initiating circuit means initiates a signal. This initiated signal is applied to an AND logic circuit. There are as many inputs to the AND logic circuit as there are indicia to be registered in a proper position by the readout device. When all of the indicia are properly registered and positioned with respect to the count in their associated counter means the AND logic circuit will produce an output signal. When the first pulse of said series of pulses is supplied to the Bistable or MEMORY circuit, the Bistable circuit is turned "ON" and produces an output signal. The outputs of the Bistable or MEMORY circuit and the AND logic circuit are connected to an output circuit means which produces an operative output signal condition in response to the coincidence of an output signal from said AND logic circuit and an output signal from said Bistable or MEMORY CIRCUIT. The check apparatus comprises a sensing member which mechanically checks to see whether or not the readout means is functioning properly and operates every time that such operative output signal condition is produced.

In one embodiment of the invention the output circuit means comprises first and second NOT logic circuits respectively connected to the outputs of the Bistable circuit and the AND logic circuit. The output of the first and second NOT logic circuits are connected to maintain a check relay normally energized. In a second embodiment of the teachings of this invention the output means comprises first and second NOT logic circuits which are respectively connected to the outputs of the Bistable circuit and the AND logic circuit, and an output NOR logic circuit having two inputs which are respectively connected to outputs of said first and second NOT logic circuits. In a third embodiment of this invention the output circuit means comprises a second AND logic circuit having two inputs and an output, with the outputs of the Bistable circuit and the before mentioned AND circuit being respectively connected to the two inputs of the second AND logic circuit. In a fourth embodiment the output circuit means comprises a NOT logic circuit connected to the output of said AND logic circuit and a check relay being maintained normally energized through an OR logic circuit by the output of said NOT logic circuit and an "OFF" output of said Bistable circuit. There must be a check or a coincidence of output signals verifying the proper set up of the apparatus which will allow the output circuit means to produce an operative output signal condition which will initiate, after the sensing member has mechanically checked the readout means, a cycle, a readout sequence, a printing cycle, or other desired cycles successive to proper registration of the information on or in the readout device.

Although the various logic circuits mentioned above are in common use in the electronic control field, a brief description of the function of each circuit is as follows. An AND logic circuit produces an output signal when, and only when, all of a plurality of input signals are present. A NOT logic circuit produces an output signal at all times unless an input signal is present. A NOR logic circuit produces an output signal only when neither a first, nor a second, nor a third, nor an Nth input signal, of an N number of inputs are present. A MEMORY logic circuit, sometimes known as a Fip Flop or Bistable circuit has "ON" and "OFF" or reset input terminals, and "ON" and "OFF" output terminals. The MEMORY or Bistable circuit produces an "ON" output signal in response to a signal applied at the "ON" input terminal and continues to produce the "ON" output signal, even though the input signal at the "ON" input terminal is removed, until a signal is applied to the "OFF" input terminal. The MEMORY circuit will then be turned "OFF" and produce an 'OFF" output signal even though the signal at the "OFF" input terminal is removed. The MEMORY circuit will revert to its initial state upon application of a signal to the "ON" input terminal. An OR logic circuit produces an output upon receiving an input signal at any of a plurality of input terminals. For further details on the construction and operation of various types of logic circuits reference is made to an article entitled "Static Switching Devices," by Robert A. Mathias in Control Engineering, May 1957.

Preferred embodiments of the invention are illustrated in the accompanying drawings.

In the drawings:

FIG. I is a block diagram of a first embodiment illustrating the teachings of this invention;

FIG. II is a block diagram of an alternate output circuit which may be utilized with the apparatus of FIG. I;

FIG. III is a block diagram of a third output circuit means which may be utilized with the apparatus of FIG. I;

FIG. IV is a block diagram of a fourth output circuit which may be utilized with the apparatus of FIG. I;

FIG. V is a front elevational view showing an assembled numerical display or printing readout device comprising five indicia bearing drum members, four of which are stopped in indicating position;

FIG. VI is an oblique view of one of duplicate assemblies comprising the readout device shown in FIG. V;

FIG. VII is a fragmentary side elevational view with parts broken away showing one of the indicia bearing drum members and a rockable support member together with a circuit controlling the indication of a count to the readout device from the counter;

FIG. VIII is a diagram of brushes and a commutator, mounted in the drum member, that are used in the circuit controlling the indication of a count;

FIG. IX is a schematic diagram of a decade counter which may be utilized in this invention;

FIG. X is a schematic diagram of certain portions of the apparatus of FIG. I;

FIG. XI is a vertical sectional view taken along the line XI—XI of FIG. XIII;

FIG. XII is a fragmentary end elevational view as seen from a position to the left of the device shown in FIG. XIII;

FIG. XIII is a fragmentary front elevational view of a modified readout device, parts being shown in section;

FIG. XIV is a fragmentary plan view of the device shown in FIG. XIII, and

FIG. XV is a fragmentary front elevational view as seen from a position to the left of the device shown in FIG. XI.

Referring now to FIG. I, there is shown a first embodiment of the teachings of the check circuit of this invention laid out in block diagram. A condition responsive device 10, which may be a weight sensing device 11 and a scanner mechanism 12 is connected to feed a series of electrical pulses, which have been generated proportional in number to the condition being measured, to a multiplier 14. The multiplier 14 has two output connections the first of which goes through a gated amplifier 16 to an "ON" input 21 of a Flip-Flop or MEMORY or Bistable circuit 20. The second output of the multiplier 14 is connected to the input of a counter or computer 34. The output of the computer 34 is connected through a binary to decimal converter 36, to a readout device 38. The output of the binary to decimal converter 36, if the converter 36 is a matrix or other strictly electronic device, may be connected to an input 41 of an AND logic circuit 40. The output, or a sample of the output, of the readout device 38 is connected to a second input 42 of the AND logic circuit 40. If binary to decimal converter 36 is of the electro-mechanical type a feedback from the output of the readout device 38 may be connected back to the binary to decimal converter 36 in order to activate a latch circuit of the converter 36 which will bring the binary to decimal converter 36 and the readout device 38 to stop on indicia corresponding to a count in the counter 34. The output of the AND logic circuit 40 is connected to an input 55 of the AND logic circuit 50. The AND logic circuit 50 has as many inputs 51-54 and 55-58 as there are previous readout circuits, for example, one readout circuit for each place in the number to be indicated.

The output of the AND logic circuit 50 is connected to the input of a NOT logic circuit 60 of an output circuit means designated generally at 26. The "ON" output of the Flip Flop 20 is connected to a NOT logic circuit 24 of the output circuit means 26. The outputs of the NOT logic circuits 24 and 60 are connected respectively to the inputs 29 and 30 of an OR logic circuit 28. The output of the OR logic circuit 28 is connected to energize a check relay 32.

If the condition responsive device 10 is comprised of a weight sensing device 11 and a scanner 12, the placing of a material to be weighed on the device 11 will cause the scanner 12 to produce or generate a series of electrical pulses proportional in number to the weight being measured. There are a number of scanning devices, that would be suitable for generating the pulses as desired, known to those skilled in the art. An example of such a scanner that may be advantageously used with this invention is described in a copending U.S. patent application entitled "Indication Scanning Device," Serial No. 553,457, filed Dec. 16, 1955, and assigned to the same assignee as the present invention and which has issued as U.S. Patent No. 2,938,126 on May 24, 1960. In brief, the scanner described in the above-referenced application comprises a condition responsive member which may be a weight sensing device, a stationary graduated opaque chart having transparent graduations, a photoelectric cell, an optical projection system having a lens that is movable along the chart and that is adapted to sweep projected images of chart graduations across the photoelectric cell, and a mask operatively connected to the condition responsive member and adapted to interrupt the projection of images from a chart to the photoelectric cell during a portion of the movement of the lens according to the position of the condition responsive member. The graduated chart in the path of the projection lens is fixed relative to the path to prevent relative vibration between the chart and the path and to provide easy means for focusing images of the chart on the photoelectric cell. Preventing relative vibration between the chart and the path of the projection lens adds to the accuracy of the indicator scanning device, since such relative vibration causes variations in frequency of the pulses of the wave trains and, if severe, may cause retrograde movement and consequently multiple scanning of some graduations. The provision of easy means for focusing images of the chart on the photoelectric cell also provides a system requiring a minimum of adjustments that must be carried out to maintain the focused condition.

Although not shown on the block diagram of FIG. I various preamps or pulse shapers may be utilized between the output of the scanner 12 and the multiplier 14 in order to obtain the desired amplitude and shape of pulses.

The multiplier 14 as shown in FIG. I is a necessary item only when the condition, such as the weight of the material, needs to be multiplied by another variable or by a constant, such as the price of the material per unit weight. If the multiplication by a predetermined figure is not desired the output of the scanner 12 could be connected directly to the counter 34 and also directly through the gated amplifier 16 to the "ON" input of the Flip Flop 20.

It may be seen that at least one and probably the first pulse of the series of pulses generated from the scanner 12 will pass through the entire previous chain of a preamp, a pulse shaper, a multiplier, and the gated amplifier to provide an "ON" input signal to the Flip Flop 20. The Flip Flop 20 was previously in the "OFF" condition in response to an "OFF" input signal applied at the reset or "OFF" terminal 22, as will be explained hereinafter.

The entire series of pulses from the scanner 12 will be counted by the counter 34 or will be computed by the combination of the multiplier 14 and the counter 34. The resultant count in the counter 34 may be fed through a binary to decimal converter 36 to the readout device 38. If the output of the counter 34 is in the binary code the converter 36 must be utilized if the readout indicia is to be registered in the decimal system. By far the majority of the computers and counters are set up to be programmed under the binary coded system. The binary to decimal converter 36 may be any of several types known to those skilled in the art. Examples of static electronic converters are the resistor and diode matrices. In the embodiment shown in this invention, an electro-mechanical binary to decimal converter is utilized.

The readout device 38 may be any of several types known to those skilled in the art, such as the electric typewriter programmed from the binary to decimal converter, a plurality of lamps which indicate by their relative positive positions the number of indicia to be readout, or lamps or tubes which each have a plurality of electrodes shaped in the forms of the indicia to be read out, each of said electrodes being ignited or caused to glow in response to a selected signal from the binary to decimal converter 36. The readout device 38 may also be of the mechanical type as shown and described hereinafter.

It is desired to sense a coincidence of a predetermined indicia shown by the readout device 38 as corresponding to a predetermined count in the counter 34 which is fed through the converter 36. This is acomplished in FIG. I by sampling the outputs of the binary to decimal converter 36 and elctrically sensing the mechanical position or sensing the particular control circuit which is energized of the readout device 38. When these two outputs are present and applied to the inputs 41 and 42 of the AND logic circuit 40, the AND logic circuit 40 will produce an output to the input 55 of the AND logic circuit 50. When using an electro-mechanical binary to decimal converter 36, as shown hereinafter, the use of an output signal from the readout device to the converter or a signal from the output of the converter itself may be utilized to activate latching circuits which will properly mechanically position the binary to decimal converter 36 and thus properly mechanically position the readout device 38.

If there are a plurality of readout devices such as the one just described it may be seen that the plurality of output signals from the respective circuits must be applied to a like plurality of inputs of the AND logic circuit 50 in order to cause the AND logic circuit 50 to produce an output signal. Assuming that there are no failures in the electronic portion of the apparatus and the proper positioning of the readout device 38 there is an "ON" output from the Flip Flop or Bistable circuit 20 and also an output from the AND logic circuit 50. In response to the coincidence of an output signal from the AND logic circuit 50 and an output signal from the Bistable circuit 20 the output circuit means 26 produces an operative output signal condition which may be utilized, as hereinbefore discussed to initiate a readout sequence, a print cycle, or a next succeeding desired sequence or cycle.

The output circuit means 26 shown in FIG. I operates in the following manner. The check relay 32 is maintained in an energized state by the output signals of the NOT logic circuits 24 and 60 through the OR logic circuit 28. According to the definition of the NOT logic circuit above, if either of the NOT logic circuits 24 or 60 stops producing an output signal in response to an input signal, then the other of the NOT logic circuits 24 or 60 will still be producing an output signal which will maintain the check relay 32 energized. Therefore, when the NOT logic elements 24 and 60 are receiving input signals from the Flip Flop or Bistable circuit 20 and the AND logic circuit 50 coincidentally then the energization will be removed from the check relay 32 and it will drop out. The drop out of the check relay 32 may be utilized in any of the many obvious ways through either a set of back or front contacts to initiate the operation of a succeeding sequence or cycle.

Referring to FIG. II there is shown an alternate embodiment of the output circuit means 26 in which the NOT logic circuits 24 and 60 have their outputs connected to a pair of inputs 63 and 64 of the NOR logic circuit 62. As described above a NOR logic circuit produces an output only when neither a first nor a second of the two inputs is present. Therefore, the coincidence of the output signals from the Flip Flop 20 and the AND circuit 50 will allow the output NOR logic circuit 62 to provide an output to initiate the operation of the succeeding cycle. It is to be realized that the outputs of the two NOT logic circuits 24 and 60 may be utilized separately or in other combinations to produce the operative output signal condition which is desired. In FIG. III the output circuit means 26 is shown as consisting only of the AND logic circuit 66 having a pair of inputs 67 and 68 respectively connected to the outputs of the Flip Flop 20 and the AND logic circuit 50. Again as in FIG. II the output circuit means 26 will then provide an output in response to the coincidence of output signals from the Flip Flop or Bistable circuit 20 and the AND logic circuit 50. In FIG. IV the check relay 32 is maintained normally energized by the "OFF" output of the Bistable circuit 20 and the output of the NOT logic circuit 60 through the OR logic circuit 28, again furnishing the desired operative output signal condition.

Referring now to FIGS. V through VIII, there is shown particular embodiments of the binary to decimal converter 36 and the readout device 38. This electro-mechanical combination may be constructed on a frame having vertically upstanding end plates 201 and 202. A complete device comprises a plurality of duplicate subassemblies, one for each place in the readout indicia or number to be indicated. The subassemblies, one of which is shown in FIG. VI, are driven mechanically by a series of spaced apart power wheels 203 mounted on a power shaft 204 journaled on bearings adjustably mounted, but not shown, in the end plates 201 and 202. The power wheels 203 are continuously rotated when the device is in operation and, when engaged, frictionally drive a plurality of intermediate drive wheels or idlers 205 each of which positively engages and rotates one of a plurality of generally cup-shaped hollow drum members 206 bearing indicia on their cylindrical surfaces. If a visual readout is desired the indicia may be in the form of numbers, for example, which would then be visible through the windows 207 in a front wall 208 of a housing enclosing the device. For the purposes of printing, the indicia on the drum 206 may be of the raised type which when wiped with an ink roller and pressed on a readout card or label prints the indicia which is registered on the readout device. The readout device may be adapted to produce both the visual and printing readout operations by the connection of the readout drums and printing drums through, for example, gearing means.

The drum member 206 is mounted for rotation on a needle bearing located axially, by means of a snap ring, (neither shown) on an axle 211 extending between the end plates 201 and 202. A flanged bearing held by a second snap ring (neither shown) on the axle 211 holds the needle bearing in place against the inner surface of the first snap ring. The idler 205 is fitted with bushings turning on an axle (neither shown) fixed to an arm of a support member 216 fixedly mounted on the flanged bearing. Thus, the rockable support member 216 and the drum member 206 have a common pivotal axis defined by the axle 211.

The idler 205 includes, to cooperate with the power wheel 203, a friction drive surface 217, which may be knurled, flanked by a gear 218 on one side and five equally spaced apart teeth 219 on the other side. When the readout device is in operation so that the power wheels 203 are constantly rotated and when the support member 216 is rocked to engage the drive surface 217 of the idler 205 with its power wheel 203, the power wheel 203 continuously rotates its associated idler 205. The rotating idler 205 drives the drum member 206 at half its speed, the gear 218 on the idler 205 being engaged with a gear 220 mounted on the side of the cup-shaped hollow drum member 206. A second gear on the side of the drum member 206 could be used to drive a train of gears to set type wheels according to the indicia displayed through the windows 207. The directions of rotation of the power wheels 203, of the idlers 205, and of the drum members 206 are indicated by arrows in FIG. VI.

When the turning drum 206 approaches the position at which it is to stop, a signal is transmitted through a circuit controlling the indication of the count, which binary to decimal converter circuit will be hereinafter described, to cause an end 222 of a solenoid operated latch 223, one of which is provided for each idler 205, to intercept the approaching of the five teeth 219 on the side of the idler 205 at a position adjacent the associated power wheel 203 thereby stopping that one of the drum members 206 at one of ten possible stopping positions. The latch 223 is fulcrumed on a bracket 224 by means of a flexure plate return spring 225, the bracket 224 extending between the end plates 201 and 202. The latch 223 is actuated by a solenoid 226 fixed to the bracket 224, the solenoid 226 being energized to actuate the latch by the signal through the circuit controlling the indication of a count. Ten possible stopping positions are provided because the readout device is to indicate in the decimal system of notation. Should some other system of notation be employed a different number of teeth 219 or a different ratio between the idlers and the drums or both would be used. The present device provides the ten stopping positions for the drum members 206 with five teeth 219 on each of the idlers 205 and a two to one ratio between the drum members and the idlers.

The signal controlling the indication of a count is carried through a binary to decimal conversion circuit shown in FIGS. VII and VIII, in which a set of nine brushes mounted on the support member 216 cooperate with a single conducting member 250 on a commutator 249 arranged in a certain pattern and carried on the drum member 206, there being a separate circuit for each drum member 206 and its associated drive. Information relative to a count accumulated in a binary system electronic counter 34 is transmitted through a series of leads A1, A2; B1, B2; C1, C2; and D1, D2 that connect four stages, hereinafter referred to as stages A, B, C, and D, of the electronic counter to the conducting member. A set of nine brushes 252 to 260, one for each of the leads A1, A2, B1, B2, etc., and one for an output lead 247 going to a latch activating circuit amplifier 130, are provided. A commutator member 249 mounted in or on the rotatable drum member 206 is provided with a conducting surface 250 and insulated surfaces 251. The commutator 249 may be mounted in any desired manner as long as it rotates in synchronism with said rotary drum 206. The series of brushes 252 to 260 are mounted in a slot 261 of the rockable support member 216 and are arranged to cooperate with the commutator 249. The output brush 252, always contacting the conducting surface 250, is connected to the output lead 247. The brushes 252 to 260 are connected two to each stage of the counter 246. In the particular arrangement the connections are:

brush 253—lead C-2 of stage C; brush 254—lead A-2 of stage A; brush 255—lead B-1 of stage B; brush 256—lead C-1 of stage C; brush 257—lead A-1 of stage A; brush 258—lead D-2 of stage D; brush 259—lead B-2 of stage B; and brush 260—lead D-1 of stage D.

The following tables show the counter condition and the voltage fed to the amplifier for each digit to be indicated (state of the counter) and each relative position of the commutator and brushes. In each of the tables the first column indicates the number registered in the electronic counter; in Table I the second to fifth columns inclusive indicate which of the leads A-1 or A-2, B-1 or B-2, C-1 or C-2, D-1 or D-2 is energized, i.e., is positive with respect to the other. The commutator in each position connects four of the eight leads, one from each pair, to the amplifier. The resulting voltage, depending upon the number of connected and energized leads, varies from four units (when all the connected leads are energized) to zero units (when none are energized). The intermediate voltage levels are one unit, two units, and three units depending upon whether one, two, or three of the connected leads are positive. The control may be arranged to operate when all the connected leads are positive or all negative.

These voltage levels are indicated in columns 2 to 11 inclusive of Table II for each position of the commutator for each number that may be registered in the counter. It should be noted that the voltage level rises and falls by unit steps and reaches four units (to stop the indicator) only once in each revolution.

TABLE I

| Number in Counter | Leads Energized | | | |
|---|---|---|---|---|
| | A | B | C | D |
| 0 | 2 | 2 | 2 | 2 |
| 1 | 1 | 2 | 2 | 2 |
| 2 | 2 | 1 | 2 | 2 |
| 3 | 1 | 1 | 2 | 2 |
| 4 | 2 | 2 | 1 | 2 |
| 5 | 1 | 2 | 1 | 2 |
| 6 | 2 | 1 | 1 | 2 |
| 7 | 1 | 1 | 1 | 2 |
| 8 | 2 | 2 | 2 | 1 |
| 9 | 1 | 2 | 2 | 1 |

TABLE II

| Number in Counter | Voltage to Amplifier in Units at Each Commutator Position | | | | | | | | | |
|---|---|---|---|---|---|---|---|---|---|---|
| | 0 | 8 | 9 | 1 | 5 | 7 | 3 | 2 | 6 | 4 |
| 0 | 4 | 3 | 2 | 3 | 2 | 1 | 2 | 3 | 2 | 3 |
| 1 | 3 | 2 | 3 | 4 | 3 | 2 | 3 | 2 | 1 | 2 |
| 2 | 3 | 2 | 1 | 2 | 3 | 2 | 3 | 4 | 3 | 2 |
| 3 | 2 | 1 | 2 | 3 | 2 | 3 | 4 | 3 | 2 | 1 |
| 4 | 3 | 2 | 1 | 2 | 3 | 2 | 1 | 2 | 3 | 4 |
| 5 | 2 | 1 | 2 | 3 | 4 | 3 | 2 | 1 | 2 | 3 |
| 6 | 2 | 1 | 0 | 1 | 2 | 3 | 3 | 2 | 3 | 3 |
| 7 | 1 | 0 | 1 | 2 | 3 | 4 | 3 | 2 | 4 | 3 |
| 8 | 3 | 4 | 3 | 2 | 1 | 0 | 1 | 2 | 3 | 2 |
| 9 | 2 | 3 | 4 | 3 | 2 | 1 | 2 | 1 | 0 | 1 |

The commutator 249 and the brushes 252 to 260 that are used in the circuit controlling the indication of a count are not part of this invention and are described for the purpose of showing circuit means controlled by a commutator for energizing the solenoid operated latch for stopping the drum member in selected positions.

The commutator 249 is shown relative to the brushes in the position it occupies to indicate a zero. In such a position the brushes 255, 256, 257 and 260 bear on insulated portions while the remaining brushes 253, 254, 258 and 259 bear on conducting portions which are electrically connected to the portion cooperating with the brush 252 which is the output brush connected to the lead 247.

As the commutator moves one step counterclockwise from the position shown, the brush 258 passes from the conducting portion to the insulated portion while the brush 260 passes from the insulated to the conducting portions. These two brushes are connected to the fourth or D stage of the electronic counter and represent a change of eight in the count.

Proceeding clockwise in the figure (counter-clockwise movement of the commutator relative to the brushes) to the following positions that are reached as the commutator continues to rotate counterclockwise one finds that in passing to the second position from the zero, the nine position, that brush 257 passes from an insulated to a conducting segment while brush 254 passes from a conducting to an insulated portion. The same continues for the succeeding steps. In transferring from each step to the next, one brush of each pair passes from an insulated to a conducting portion while the other brush of the pair passes from a conducting to an insulated segment. In this arrangement for any possible position of the commutator with respect to the brushes four of the brushes bear on insulated portions of the commutator while the remaining four brushes bear on conducting portions. By the pattern of the insulated portions in respect to the conducting portions these combinations are varied to correspond to the combinations of conducting states in the electronic counter representing each of the digits 0 to 9 inclusive. The drum members 206 are stopped in positions corresponding to such combinations of conducting states when a signal from the counter energizes the solenoid 226. As the commutator 249 approaches a position corresponding to the count in the counter the voltage on the output lead 247 rises stepwise from one voltage level to the next as it approaches the final position. This arrangement avoids the production of large transient voltages which may interfere with the operation of the counter.

To summarize: The readout device is connected to the electronic counter 246 when it is desired to display or print numerical figures corresponding to the count accumulated in the counter in conventional and aligned figures so that they may be easily read or printed. When the display device is in operation and when the power wheels 203 are engaged by the idlers 205, the drive for the drum members 206 bearing indicia on their cylindrical surfaces is positioned as shown in FIG. VI with the power wheels 203 continuously rotating and driving the idlers 205 and the drum members 206. The directions of rotation are indicated by arrows in FIG. VI.

The drum members 206, once started, are continually in motion until they are stopped in positions corresponding to a count in the controlling electronic counter 246. The drum members 206 are stopped in such positions in response to a signal from the counter by the action of solenoid operated latches 223 engaging the idlers 205 and stopping the drum members 206 gear engaged with the idlers at one of ten possible stopping positions.

The inertia of the stopping driven members rocks their associated support members 216 counterclockwise, as viewed in FIG. VII, out of engagement with the sector 231 which are then instantly urged against the idlers 205 under the action of the springs 232. In such position, each sector 231 locks its latch 223 to accurately hold its drum member 206 to align one of the ten indicia on the periphery of the drum in viewing position.

When a new reading is to be made, the rotary solenoid 241 is caused to be energized momentarily rocking the shaft 239 and the bar 242 attached thereto. The bar 242 first rocks the sector 231 clockwise unlocking the stopped drum members 206 and then rocks the support members 216 in the same direction about the axis of the shaft 211 to bring the idlers 205 into frictional engagement with the power wheels 203, whereby all of the rotatable drum members 206 are simultaneously, quickly and positively started and continue in motion until they are each again stopped and locked in indicating positions corresponding to a count in the corresponding section of the controlling electronic counter 34.

For a more detailed description of the construction and operation of such a binary to decimal converter and a readout device reference is made to U.S. Patent No. 2,759,672, issued August 21, 1956, and entitled "Mechanical Drive Numerical Display Devices."

An electronic counter of the binary type suitable for energizing the commutator shown in FIG. VIII is illustrated schematically in FIG. IX. Such a counter comprises four stages A, B, C and D. These stages are substantially identical and each comprises a bistable multivibrator circuit that may be switched from one condition of stability to another and back again by a succession of input pulses.

The first stage, stage A, comprises a dual triode tube 330 having a first plate 331 connected through a lead 332 and resistors 333 and 334 to a B+ line 335 maintained at about 150 volts positive with respect to a grounded lead 337. A cathode 336 cooperating with the plate 331 is connected directly to a grounded lead 337. A grid 338 cooperating with the cathode 336 and plate 331 is connected through a resistor 339 to an input condenser 340 and also through the resistor 339 and a second resistor 341 to a negative return lead 342 maintained at approximately 150 volts negative with respect to the grounded lead 337. The grid 338 is also connected through a grid to plate resistor 343 and a plate resistor 344 to the B+ lead 335. The resistor 343 is bypassed with a small condenser 345. The junction between the resistors 343 and 344 is connected directly to a plate 346 of the second half of the dual triode 330. This plate cooperates with a cathode 347 connected directly to the grounded lead 337. A grid 348 cooperating with the cathode 347 and plate 346 is connected through a grid return resistor 349 to the input condenser 340 and through the return resistor 341 to the negative return lead 342. Furthermore the grid 348 is connected through a grid to plate resistor 350 to the plate resistors 333 and 334 and, through the lead 332, to plate 331. The resistor 350 is bypassed with a condenser 351.

This circuit is symmetrical side for side in that the plate resistors 333 and 334 cooperating with a plate 331 are identical in total resistance value to the plate resistor 344 connected to the second plate 346. Likewise the grid return circuits including the resistors 339 and 349 are identical and have the common return resistor 341. The plate to grid resistors 343 and 350 are identical as well as the condensers 345 and 351. In order to provide a visible indication of the condition of this circuit the lead 332 is connected through a resistor 352 and neon bulb 353 to the grounded return lead 337. The bulb 353 will glow as long as current is flowing through the plate 346 and cathode 347 which occurs as long as the first half of the tube including the plate 331 is at current cutoff. Typical resistance values for the resistors 344 and the combination 333, 334 is 40,000 ohms for each plate circuit. The plate to grid resistors may be of the order of 100,000 ohms each, the grid to common resistors 339 and 349 may be approximately 50,000 ohms each, and the common to negative return lead resistor 341 should be in the order of 100,000 ohms. The condensers 340, 345 and 341 may be made of the order of 300 micromicrofarads.

When the apparatus is first turned on neither section of the dual triode 330 is conducting current and each of the grids 338 and 348 tends to assume a potential somewhat positive with respect to the grounded lead 337. Therefore each side of the triode immediately begins to conduct the current thereby increasing the voltage drop through the resistors 333, 334 and the resistor 344. As the plate potentials drop in response to this current flow the grids 338 and 348 are each driven negative thereby tending to cutoff the current flow through each half of the tube. Because of unavoidable differences in filament heating time, tube conductivity, and resistance values one grid will cutoff its current flow more rapidly than the other and the circuit will stabilize itself with one half of the dual triode conducting current and the other half completely cutoff.

Suppose that the left half of the tube, that is the plate 331, be conducting current. The potential of the lead 332 is positive with respect to the grounded lead 337 by the voltage drop across the conducting portion of the tube. The potential of the lead A2 connected to the plate 346 however will be much more positive because the second half of the tube including the plate 346 is at current cutoff. Likewise the grid 348 is negative with respect to its cathode 347 while the grid 338 is slightly positive with respect to the cathode 336 and some grid current flows from the grid 338 to the cathode 336. The condenser 345 is charged to slightly more than 100 volts while the condenser 351 is charged to a voltage of the order of 20 to 40 volts. If, while the tube is operating in this condition, a negative pulse be applied to the input condenser 340 so as to drive the junction between the resistors 339 and 341 negative the grids 338 and 348 are both driven negative thereby completely cutting off current flow through both halves of the dual triode 330. Upon the decay or passage of the pulse as the grids 338 and 348 tend to become positive the grid 348 leads in this change because of the small voltage charge on the condenser 351 as compared to the charge on the condenser 345. Therefore, the second half of the triode, i.e., the plate 346 and cathode 347 will draw plate current rather than the first half including the plate 331. Plate current flow through the second half, by flowing through the resistor 344, prevents the grid 338 from becoming sufficiently positive to allow any current flow through the first half of the tube. Therefore, the stage stabilizes after the pulse with the second half conducting and the first half cutoff. In this condition voltage of the plate 331, lead 332 and the lead A-1 leading to the commutator, is sufficiently positive to illuminate the neon light 353 and provide the positive voltage required for operation of the commutator.

The next negative pulse supplied through the input condenser 340 reverses the state of conduction of the triode 330 with the first half including the plate 331 drawing current so as to extinguish the neon bulb 353, reduce the voltage on the lead A-1, and raise the voltage on the lead A-2. When the first half of the triode 330 starts to draw plate current upon the decay of the second input pulse the plate voltage and the potential of the lead 332 drop sharply. This produces a sharp negative voltage pulse at the grid 348 which is transmitted through a lead 354 and a condenser 355 serving as the input condenser for the second stage B.

The second stage includes a dual triode 360 having a first plate 361 connected through a lead 362 to a resistor 363 which is connected directly to the B+ lead 335. A cathode 336 cooperates with the plate 361. This cathode is connected directly to the grounded lead 337. A grid 368 cooperating with the plate 361 and cathode 366 is connected through a resistor 369 to the input condenser 355 and to a resistor 371 which is connected to the negative return lead 342. A plate to grid resistor 373 corresponding to the resistor 343 connects the grid 368 to a plate resistor 374 and to a plate 376 of the second half of the dual triode 360. The plate 376 cooperates with a cathode 377 and grid 378. The cathode 377 is connected to the grounded lead 337 while the grid 378 is connected through a resistor 379 to the input condenser 355 and resistor 371 and through a second resistor 380 to the lead 362 and plate resistor 363 of the first half of the dual triode 360. Condensers 375 and 381 corresponding to the condensers 345 and 351 bypass the plate to grid resistors 373 and 380. The condition of conduction in this second stage is indicated by current flow through a resistor 382 and a neon light 383.

Output pulses from the second stage B of the counter are transmitted through a small condenser 385 to the input circuit of the third stage C of the counter. This stage is similar to the preceding stages and includes a dual triode 390 corresponding to the triodes 330 and 360. This stage includes the first half plate 391 that is connected through a lead 392 and plate resistor 393 to the B+ lead 335. A cathode 396 cooperating with a plate 391 is connected to the grounded lead 337 while a grid 398 cooperating with the plate 391 and the cathode 396 is connected through a grid resistor 399 to the input condenser 385 and through a resistor 401 to the negative return lead 342. Likewise, the grid 398 is connected through a grid to plate resistor 403, corresponding to the resistors 343 and 373, to a plate resistor 404 connected to the B+ lead 335. A condenser 405 bypasses the grid to plate resistor 403. The junction between the resistors 403 and 404 is connected to a second plate 406 of the triode which cooperates with a cathode 407 and grid 408. The grid 408 is connected through the grid resistor 409 to the input condenser 385 and the resistor 401 connected to the negative return lead 342. The grid 408 is also connected through a grid to plate resistor 410 to the plate resistor 393 of the first half of the dual triode. A condenser 411 is connected in parallel with the grid to plate resistor 410. The state of conduction of this stage is indicated by current flow through a resistor 412 and neon lamp 413. Output pulses from stage C are taken from the grid connection between the resistors 409 and 410 through a lead 414 and output condenser 415.

The fourth stage D is similar to the others and includes a dual triode 420 having a first plate 421 that is connected through a lead 422 to series plate resistors 423 and 424 the latter being connected to the B+ lead 335. A cathode 426 cooperating with a plate 421 is connected directly to the grounded lead 337. A grid 428 cooperating with the cathode 426 is connected through a grid resistor 429 to the input condenser 415 and a return resistor 431 connected to the negative return lead 342. The grid 428 is also connected through a grid to plate resistor 433 and plate resistor 434 to the B+ lead 335. The resistor 433 is bypassed by a condenser 435. A plate 436 of the second half of the dual triode 420 is connected to the junction between the resistors 433 and 434. This plate 436 cooperates with a cathode 437 and a grid 438. The grid 438 is connected to the input condenser 415 by a grid resistor 439 and is connected to the plate 421 through a resistor 440 and parallel connected condenser 441. The resistors and condensers are similar to those used in the preceding stages and the state of conduction of this stage is indicated by current flow through a resistor 442 and neon bulb 443.

If nothing more were added to the circuit the first stage A would reverse its state of conduction at every pulse, the second stage B would reverse its state of conduction at every second pulse. Likewise, the third stage C would reverse on every fourth pulse while the last stage D would reverse on every eighth pulse. Thus, for four stages sixteen pulses complete the sequence and leave the states of conduction in exactly the same condition as at the start of the sequence. In order that the counter may be used in a decimal system in conjunction with other decades, that is, give an output pulse for every tenth input pulse and reset to zero on each tenth impulse certain cross connections are employed. Thus a junction between the plate resistors 333 and 334 of stage A is connected through a lead 444 and condenser 445 to the grid 438 of the fourth stage. The condenser 445 is preferably made about ⅛ the capacity of the condensers 345, 351, 375, 385, etc. This circuit through the condenser 445 supplies a small negative pulse each time the first stage A transfers conduction from its second half to its first half, i.e., when it transfers from an even count to an odd count. During the first eight counts assuming that the counter was initially in the condition with each of the left halves of the tubes conducting the negative pulses applied to the condenser 445 have no effect because the grid 438 is already negative because of the current flow through the first half of the tube 420 and the plate resistors 423 and 424. Following the eighth pulse when stages A, B and C return to their original condition stage D is left with the second half conducting, i.e., with current flow through the plate 436 and cathode 437. Under this condition grid 438 is slightly positive with respect to its cathode. The ninth pulse applied to the input condenser 340 causes the first stage A to reverse its condition. The tenth pulse applied to the input condenser 340 again reverses the first stage A and in so doing causes the application of a negative pulse through the lead 444 condenser 445 to momentarily drive the grid 438 negative with respect to its cathode 437. As the grid 438 is driven negative and cuts off current flow through the plate 436, an amplified impulse appears at the junction between the resistors 433 and 434 in a positive direction tending to allow the first half of the tube 420 to draw current. As this current flow increases the grid 438 is driven further negative as in an ordinary transfer to provide an output pulse on lead 446 connected to a succeeding decade. Thus stage D is returned to its original position on the first even pulse applied to the input condenser 340 of stage A following the eight previous pulses. The tenth pulse simultaneously with operating stage D also applied a negative impulse through input condenser 355 to the second stage B to cause it to transfer to its second half conducting condition. This stage is reset to its original condition by current flow through a lead 447 connected to the junction between the plate resistors 423 and 424 of stage D and a condenser 448 connected directly to the grid 378 of stage B. The condenser 448 is preferably half the capacity of the condensers 381 or 385 and serves to drive the grid 378 negative during the stabilization of stage B following the input pulse through condenser 355 so that stage B instead of remaining in its second condition with the second half conducting returns immediately to its first condition with the plate 361 conducting current. Thus, the four stages return to zero indication.

It may be desirable to reset the counter prior to any particular event. This resetting may be easily accomplished either by opening the cathode circuit to the second half of each of the stages, that is, the circuit to the cathodes 347, 377, 407, and 437, or by simultaneously applying a short negative pulse to the grids 348, 378, 408 and 438. While the resetting impulse should be of short duration it must nevertheless be somewhat longer than the impulses transmitted through the input condensers 340, 355, 385 and 415, of each of the stages.

When this counter decade is in a condition to indicate zero all of the neon bulbs 353, 383, 413 and 443 are extinguished thus indicating that leads A-2, B-2, C-2, and D-2 are at their maximum positive potentials. In this event when the commutator arrives at a position where it connects these four leads together a maximum positive potential is applied to the grid of the amplifier tube 130 so as to energize the latch solenoid 226 and stop the drum 206. Other counts are indicated by corresponding combinations of voltages on the leads A-1, A-2, B-1, B-2, etc., as hereinbefore discussed.

Referring now to FIG. X, there is illustrated a schematic diagram embodying the features and teachings of this invention. In particular there are shown, schematically, the circuits which may be used for the gated amplifier 16, the Flip-Flop 20, the AND logic circuit 50, the NOT logic circuit 60, the OR logic circuit 28, and the check relay 32. The output circuit combination that is represented schematically in FIG. X is shown in block diagram form in FIG. IV.

The gated amplifier 16 comprises a three electrode electronic device 100 having a pair of load circuit electrodes, an anode 101 and a cathode 102, and a control electrode or grid 103. The anode 101 is connected through an anode load resistor R11 to a first supply source 1B+. The cathode 102 is connected through the system or chassis ground.

The control or grid electrode 103 is connected through resistors R16 and R15 to a source of high bias voltage V2 which has a rather low current output. The junction of the resistors R15 and R16 is connected through a switch SW1 to a second bias source V1 which has a lower voltage than the first bias supply V2 but a much stronger current output. The grid or control electrode 103 is also coupled through a coupling capacitor C1 to the output of the scanner 12 or the multiplier 14 depending upon whether or not the multiplier is deleted from the circuit as hereinbefore described.

The Flip Flop 20 comprises a pair of three electrode electronic devices 110 and 120 which may be two halves of a dual triode as shown. The electronic device 110 has a pair of load electrodes, the anode 111 and cathode 112, and a control or grid electrode 113. The electronic device 120 has two load electrodes, an anode 121 and a cathode 122, and a grid or control electrode 123. The load electrodes 111, 112 and 121, 122 of the electrode devices 110 and 120 are respectively connected through anode load resistances R20 and R21 to a floating supply voltage 2B+ from one side and through a common cathode resistor R25 to the floating ground 2B— on the other side. The junction of the anode 111 and the resistor R20 is connected through a voltage divider comprising resistances R26 and R27 to the floating ground 2B—. The junction of the voltage divider resistors R26 and R27 is connected to the grid or control electrode 123 of the electronic device 120. The junction of the anode 121 and the resistor R21 is connected through a first voltage dividing network comprising the resistors R22, R23, and R24, to the floating ground 2B—. The junction of the anode 121 and the resistor R21 is also connected through a second voltage divider comprising resistors R28 and R29 to the floating ground 2B—. The output of the Flip Flop 20 is from the junction of the resistors R28 and R29 through a gas tube device NE1.

The grid or control electrodes 113 and 123 are also respectively cross-connected to the anodes 121 and 111 through the feed back capacitors C15 and C19. The grid or control electrodes 113 and 123 are also connected to the floating ground 2B— through the grid loading capacitors C17 and C20 respectively. The output of the gated amplifier 16 is coupled through a coupling capacitor C18, the rectifier CR10 in the reverse direction, and the input capacitor C16 to the grid or control electrode 113 of the electronic device 110. The resistors R30, R31, R32 and R33 in combination with the rectifier CR10 form a clipping circuit to clip a portion of the signal from the gated amplifier 16 to the input capacitor C16 of the Flip Flop 20. The resistors R32 and R33 are connected in series between the floating ground 2B— and the floating supply 2B+. The resistor R30, the rectifier CR10, and the resistor R31 are connected in series between the floating ground 2B— and junction of the resistors R32 and R33. The operation of this clipping circuit will be described hereinafter. A reset capacitor C12 and its charging resistor R17 are connected in series between the floating 2B+ supply and the floating 2B— ground. The junction of the reset capacitor C12 and the resistor R17 is connected through a switch SW2 to the junction of the resistors R23 and R24.

On the left side of the lower half of the schematic FIG. X is shown one method for deriving the floating power supply, designated hereinbefore as 2B+ and 2B—. A power supply 2B+ is connected across a voltage dividing network comprising a resistor R1, an adjustable tapped resistor R13 and a resistor R2 which is connected to the chassis or system ground. The tap of the voltage dividing network supplies the 2B+ voltage and the tap of the adjustable resistor R13 supplies the 2B— floating ground voltage. This 2B— floating ground voltage is supplied to the latch activating circuits and the AND logic circuit 50, to be hereinafter described, through the normally closed switch SW3. A resistor R8 and a capacitor C2 are also connected in series between the 2B+ supply and the chassis or system ground. The junction of the resistor R8 and the capacitor C2 is connected to the side of the switch SW3 opposite that which is connected to the tap on the resistor R13. Therefore, while the switch SW3 is closed the junction of the resistor R8 and the capacitor C2 supplies the 2B— floating ground voltage as hereinbefore described.

Since the latch activating circuits are identical in connection and operation only one of them will be described. The latch activating circuit 130 comprises a three electrode electronic device having two load electrodes 131 and 132, anode and cathode, and a grid or control electrode 133. The activating coil of its associated latch solenoid, the anode electrode 131, the cathode electrode 132 and a cathode resistor R3, are connected in series circuit relationship between the floating 2B+ supply and the floating 2B— ground. The bypass capacitor C4 is connected in parallel with the cathode resistor R3.

The AND logic circuit 50 comprises the rectifiers CR1, CR2, CR3 and CR4, a voltage dropping resistor R10 and an output resistor R9. The voltage dropping resistor R10 is connected from the floating 2B+ supply through each of the rectifiers CR1, CR2, CR3 and CR4 through its respective associated low impedance cathode resistor path R3, R4, R5 and R6 to the floating 2B— ground. When none of the latch activating circuits are conducting the cathode resistors provide low impedance paths for the current to flow from the floating 2B+ supply to the floating 2B— ground. When all of the latch activating electronic devices are conducting the current flow through the associated cathode resistors causes a voltage drop across each cathode resistor to block its associated CR rectifier and thus block the low impedance path that was hereinbefore presented. As long as at least one of the latch activating electronic devices is not conducting the low impedance path thereby presented presents an output to the output resistor R9 of the AND logic circuit 50. Therefore, when all of the latch activating circuits are conducting an output appears on the resistor R9.

The NOT logic circuit 60 comprises a three electrode electronic device having a pair of load circuit electrodes, anode 171 and cathode 172, and a grid or control electrode 173. The anode 171 is connected through an anode load resistor R7 to the floating 2B+ supply. A voltage divider comprising the resistors R18 and R19 is connected between the 2B+ supply and the 2B— floating ground. The cathode 172 is connected to the junction of the resistors R18 and R19. The grid or control electrode 173 is connected to the output of the AND logic circuit 50 through the resistor R9. The output of the NOT logic circuit 60 is taken through a two electrode gas tube NE2.

The OR logic circuit 28 comprises a three electrode electronic device 180 having a pair of load electrodes, anode 181 and cathode 182 and a grid or control electrode 183. The anode 181 is connected to the 2B+ floating supply. The cathode 182 is connected through an activating coil of the check relay 32 to the floating 2B— ground. The grid or control electrode 183 is connected to the output of the NOT logic circuit 60 from the gas filled tube NE2 and is also connected through a resistor R12 to the output of tthe Flip Flop 20 through the gas filled tube NE1. The grid or control electrode 183 is connected through the resistor R12 and a time delay capacitor C8 to the floating 2B— ground. A discharge resistor R14 is connected in parallel with the time delay capacitor C8.

The operation of the circuit and apparatus of FIG. X is as follows. Assume that the electronic device 110 of the Flip Flop circuit 20 is conducting through its load electrodes 111 and 112. Therefore, the grid 123 of the electronic device or tube 120 is kept at a potential close to the 2B— ground and the tube 120 is not conducting. Therefore, the potential on the anode or plate 121 of the tube 120 is close to the potential of the floating 2B+ supply and has a voltage sufficiently high to ignite or fire the gas tube NE1 and supply an output to the grid or control electrode 183 of the tube 180 of the OR logic circuit 28.

Assume also that all of the latch activating circuits are not conducting thereby furnishing low impedance paths through the rectifiers CR1 through CR4 of the AND logic circuit 50 and their associated cathode resistances to ground. If at least one of the latch activated tubes is not conducting there will be no output through the resistor R9 to the grid or control electrode of the tube 170 of the NOT logic circuit 60. Therefore, the tube 170 will not be conducting and the potential of the anode or plate electrode 171 will be sufficiently high to ignite or fire the gas tube NE2 and supply an output to the grid or control electrode 183 of the tube 180 of the OR logic circuit 28. The tube 180 of the OR logic circuit 28 will conduct through its anode 181 and cathode 182 circuit and hold the check relay 32 energized as long as there is an output from either the NOT logic circuit 60 or the Flip Flop or Bistable circuit 20.

Assume now that an item is placed upon the weight sensing device 11 causing the scanner 12 to generate a series of pulses to the multiplier 14. At least one of the pulses from the multiplier 14, probably the first one, will be passed through the coupling capacitor C1 and applied to the grid or control electrode 103 of the tube 100 of the gated amplifier 16. Prior to placing the item on the weight sensing device 11 the switch SW1 was open. This biased the grid or control electrode 103 through the high voltage bias source V2 through the resistors R15 and R16 to stop conduction in the tube 100. Upon placing the item on the weight sensing device 11 the gating switch SW1 which is operatively linked to the weight sensing device 11 is closed. This places a lower voltage bias on the grid or control electrode 103 of the tube 100 so that a negative pulse fed through the capacitor C1 from the scanner will be sufficient to start the tube 100 conducting. The pulse through the coupling capacitor C1 must have a negative amplitude that is somewhere between the positive amplitudes of the bias voltages V1 and V2. Thus, the amplifier 16 is gated only in response to the closing of the gating switch SW1. This adds an additional feature of reliability to the system since no false signals are allowed through the amplifier 16 before an actual weighing operation.

When the tube 100 starts conducting the potential of the anode electrode 101 is lowered suddenly toward system or chassis ground causing a negative pulse to be passed through the coupling capacitor C18 to the input of the Flip Flop 20. The combination of the resistors R33 and R32, of the clipping circuit hereinbefore described, provides a voltage divider which biases the junction of the resistors R32 and R33 at some intermediate level between the floating 2B+ supply and the floating 2B— ground. This applies a positive reverse bias through the resistor R31 on the input rectifier CR10. Therefore, when the negative pulse is passed by the capacitor C18 a first predetermined magnitude of said pulse is clipped by the positive reverse bias on the rectifier CR10. This allows the Flip Flop 20 to take advantage of the high signal to noise ratio of the input signal. The capacitors C17 and C20 that connect each of the grid or control electrodes 113 and 123, respectively, to the floating 2B— ground are so connected to decrease the sensitivity of the Flip Flop 20 also taking advantage of the good signal to noise ratio characteristics of the input signal. By capacitively loading the grids, the sensitivity can be altered without altering the direct-current characteristics of the Flip Flop 20. Further, the combined effect of the two pairs of capacitors C15, C17 and C19, C20 tends to wash away any stray capacitance effects in the Flip Flop 20.

The input signal from the gating amplifier 16 is thus passed through the rectifier CR10 in a reverse direction and the capacitor C16 to the grid 113 of the tube 110. The negative input signal to the grid 113 tends to stop the tube 110 from conducting. If the tube 110 starts to cease conduction the potential of its plate 111 rises which gives a positive signal through the capacitor C19 to the grid 123 of the tube 120 which tends to start the tube 120 conducting. As the tube 120 starts to conduct the potential on its plate 121 starts falling, which is passed through the capacitor C15 to the grid 113 of the tube 110 which further adds to the input signal which is causing the conduction of 110 to cease. The two just described effects combine to make the Flip Flop 20 snap from one state of conduction to the other. When the tube 120 is fully conducting, the potential on the plate 121 is lowered below the extinguishing voltage of the gas filled tube NE1, advantageously a neon tube, and therefore the signal will be removed from the OR logic circuit 28.

Referring now to the operation of the latch activating circuits it can be seen that when a rotary indicia bearing wheel of FIG. VI is properly positioned, the commutator 249 of the binary to decimal converter will also be properly positioned with respect to the associated controlling counter as hereinbefore described. Therefore there is an output from the output brush 247 from the commutator 249 which is fed to the associated latch activating circuit. Assume that this latch activating circuit embodies the electronic tube 130. As is shown in FIG. X the input from the binary to decimal converter, i.e., the input from brush 247, is fed to the grid 133 of the tube 130. This drives the tube 130 to conduction in the load electrode circuits 131 and 132 which pulls in its latch solenoid and stops the rotation of the indicia bearing rotary member or number wheel and its associated binary to decimal commutator. Because fast operation of this latch solenoid is necessary requiring full tube conduction, the cathode resistor R3 is effectively bypassed for a first predetermined length of time by the capacitor C4. Current flow in the tube 130 causes a voltage drop across the resistor R3 which blocks the low impedance path through the rectifier CR1 that was previously available to the AND logic circuit 50.

When all of the plurality of tube sections are conducting, corresponding to the number of readout devices that are properly positioned, the AND logic circuit 50 will have an output through the resistor R9 to the NOT logic circuit 60. That is, the output of the AND logic circuit 50 is applied to the grid or control electrode 173 of the tube 170 which causes the tube 170 to conduct. The potential on the plate 171 drops toward the potential of the floating 2B— ground and the gas filled tube, advantageously a neon tube, NE2 is extinguished and a second input to the OR logic circuit 28 is removed. The gas filled tubes NE1 and NE2 on the outputs of the Flip Flop circuit 20 and the NOT logic circuit 60 are advantageously used since when the output voltage of the Flip Flop 20 or the NOT logic circuit 60 goes below the extinguishing voltage of the gas filled tubes the tubes will extinguish and the output will be zero potential rather than what is actually the particular plate potential at the time. Since both inputs are removed from the OR logic circuit 28, that is, the grid or control electrode 183, the tube 180 will cease to have conduction in the anode 181—cathode 182 circuit and the activating coil of the check relay 32 will be deenergized allowing the check relay to drop out. The dropping out of the check relay 32 furnishes the operative output signal condition which may be utilized to initiate a succeeding cycle whether it be a readout sequence, a printing cycle, or other sequence or cycle.

The advantages of obtaining the sampling signal for the AND logic circuit 50 from the cathodes of the latch activating circuits rather than from the anodes where a larger signal is available should be noted. Due to the nature of the use of the latch solenoid, very fast drop out time is requisite. This dictates that the residual current through the latch solenoid coil should be very small, preferably none at all. Semi-conductor diodes for use in the AND logic circuit 50 are available having a back resistance in the nature of 105 or 106 ohms at a relatively low price. Furthermore, the magnitude of this back resistance may decrease with time and temperature. To use these diodes in the plate or anode circuit is not practical when these tolerances and conditions are accounted for and would prove very unreliable. By obtaining the signal from the cathode circuit, the operation of the latch solenoid is not affected. Furthermore, it can be shown that the reverse to forward conduction ratio necessary to obtain a full step for the condition where, for example, several of the latch solenoids are energized and then the last one operated, is not at all critical and is greatly exceeded by the inexpensive diode above. This is made possible by the very low impedance signal available from the latch activating circuit. Thus, in the embodiment shown it is possible to use diodes that are less expensive.

After the printing cycle or other readout sequence is completed the latch activating circuits will be deenergized by opening the normally closed switch SW3, thus removing the connection from the floating 2B— ground. Because the latch activating circuits and the Flip Flop circuit have been operating above system or chassis ground by the value of the floating 2B— ground, the opening of the switch SW3 causes the potential at the junction of R8 and C2 to change to the potential of 2B+. The signal from the gated amplifier 16, which operates at system or chassis ground, is R-C coupled to the Flip Flop 20 with a time constant which differentiates this signal. Since an abrupt change in the floating ground level from 2B— to the value of 2B+ would appear in series with the signal to the Flip Flop 20, therefore appearing as a signal to it the capacitor C2 is utilized. The capacitor C2 is connected between the chassis ground and the 2B— floating ground so that the rate of change from floating 2B— ground to the floating 2B+ supply, or vice versa, is slow enough that the time constant of the differentiating network will not pass it.

The Flip Flop 20 may be reset at the end of a print cycle by closing the switch SW2. This allows the capacitor C12 to discharge through the resistor R24 which applies positive signal to the grid 113 of the tube 110. This starts the tube 110 toward conduction and by reversal of the feedback effects described above the Flip Flop 20 snaps back to its original conduction state.

The capacitor C8 connected between the floating 2B— ground and the control electrode 183 of the tube 180 of the OR logic circuit 28 functions as a time delay for two conditions. Assume that there had just been a zero weight condition which actuated the latch actuating circuits but did not produce an "ON" output condition in the Flip Flop circuit 20 since there were no pulses generated by the condition responsive device 10. Assume next that the check circuit is reset and an item of some definite weight is placed on the condition responsive device 10. Then the capacitor C8 will hold the Flip Flop output signal on the OR logic circuit 28, that is, to the grid or control electrode 183 of the tube 180, until the RC circuits comprising the bypass capacitors and the cathode resistors of the latch activating circuits have had sufficient time to discharge. If the capacitor C8 were not there it would be possible to obtain a checking condition from a check relay 32 under the above described circumstances. The capacitor C8 is charged from the plate or anode 171 of the NOT logic circuit 60 through the gas filled tube NE2 and will discharge when the gas tube NE2 is extinguished. Under a second condition, if one wheel or rotary drum member 206 of the readout device 38 is still rotating the charge on the capacitor C8 will hold the tube 180 of the OR logic circuit 28 conducting until the last binary to decimal commutator reaches its new position of four energized segment brushes on the conducting surface 250 of the commutator 249.

In the foregoing description there is disclosed a check circuit which insures that at least one pulse has passed from the condition responsive device through a preamp, shaper or other elements in the multiplier chain, and that all of the indicia bearing rotary drum members of the readout device have been positioned properly with respect to the state of the corresponding counter or computer which controls the rotary drum member. Failure of the scanner projection lamp or any tube from the preamp to the last multiplier stage that would eliminate the signal and, with no protection, initiate a print cycle with no computations available is then provided for. The failure of an indicia bearing readout wheel to position on indicia corresponding to the state of the controlling decade counter prevents the initiation of a printing cycle or readout sequence. The failure of an indicia bearing rotary member to lock up and thereby be misregistered also prevents the initiation of a readout sequence or printing cycle. The failure of an indicia bearing rotary drum member to stop rotating which might be caused by a latch activating circuit failure, a broken lead, or other cause again prevents the initiation of the print cycle or readout sequence.

Referring now to FIGS. XI through XV, there is shown a second embodiment of the readout device 38. The second embodiment includes a sensing device which, in response to the dropout of the check relay 32, mechanically checks to see whether or not the readout device is functioning properly before the operation of a succeeding cycle, e.g., a print cycle, is initiated. The binary to decimal converter 36 shown in FIGS. VII and VIII also is used with the second embodiment of the readout device.

The electro-mechanical combination of the binary to decimal converter 36 and the second embodiment of the readout device is constructed on a frame 501 having upstanding end members 502, the frame 501 having a flat bottomed U-shape as viewed from the front (FIG. XV). The complete device comprises a plurality of duplicate subassemblies, one for each place in the number to be indicated. The several subassemblies, one of which is shown in FIG. XI, are driven by a series of rubber-tired power wheels 503 mounted on a power shaft 504 journaled in bearings in the upstanding end frame members 502. The power wheels 503 are continuously rotated when the readout device is in operation and, when engaged, frictionally drive a plurality of intermediate drive wheels or idlers 505. Each of the idlers 505 has a gear 506 meshed with a gear 507 on a generally cup-shaped hollow drum member 508 bearing indicia on its cylindrical surface, there being a drum member for each idler, the total number depending on the places in the number to be indicated. The indicia are like those shown in FIG. V and are visible through windows like those shown in FIG. V. A second gear 509 (FIG. XIII) on each of the drum members 508 is used to set up type wheels (not shown) corresponding to the indicia displayed through the windows.

Each of the drum members 508 is mounted for rotation on a hub 510 which in turn is mounted for rotation on a stationary shaft 511 supported by the end frame members 502. Each of the idlers 505 is rotatably mounted on a pin 512 fixed to a support member 513 which, because each of the support members 513 is mounted on one of the hubs 510, is rockably mounted on the stationary shaft 511. Thus, there is a rockable support member 513 carrying an idler 505 together with an associated drum member 508 for each place in the number to be indicated. The rockable support members 513 and the drum members 508 have a common pivotal axis defined by the axis of the stationary shaft 511. A clamp 514, in the form of a split tube, on the right hand end of the stationary shaft 511 as viewed in FIG. XIII, locates the right hand one of the rockable support members 513, the hub 510 of such support member contacting such clamp 514. The next one of the hubs 510 is located on the stationary shaft 511 in contact with the gear 509 to its immediate right, the subassemblies being stacked on the shaft 511 one against the other as shown in FIG. XIII. A spacing washer 515 on the stationary shaft 511 contacts the left hand one of the gears 509 and an end of a second clamp 516 which also is in the form of a split tube contacts such washer 515. The axial position of the subassemblies on the stationary shaft 511 is adjusted by shifting the clamps 514 and 516 axially on the stationary shaft 511.

The idlers 505 each includes, to cooperate with the power wheel 503, a friction drive surface 517, which may be knurled, flanked by the gear 506 on one side and by five equally spaced teeth 518 on the other side. When the readout device is in operation so that the power wheels 503 are constantly rotated and when the support members 513 are rocked to engage the drive surfaces 517 of the idlers 505 with the power wheels 503, the power wheels continuously rotate the idlers. The rotating idlers 505 drive the drum members 508 at half their speed, the idlers being engaged at all times with the drum members through the meshed gears 506 and 507.

When a turning drum 508 approaches the position at which it is to stop, a signal is transmitted through the circuit, i.e., the binary to decimal converter circuit 36, controlling the indication of the count to cause an end 519 of a solenoid operated latch 520, one of which is provided for each idler 505, to intercept the approaching one of the five teeth 518 on the side of the idler 505 at a position adjacent the associated power wheel 503 thereby stopping that one of the drum members 508 at one of ten possible stopping positions. A plate 521, held by means of screws 522 on the frame 501, supports each of the four Z-shaped brackets 523, one for each of the latches 520, by means of a pair of screws 524 threaded through a small plate 525 and into the Z-shaped bracket 523. The screws 524 hold the small plate 525 up against the lower ends of a pair of screws 526, the screws 524 and 526 providing adjustments for suitably positioning the Z-shaped bracket 523. The latch 520 is fulcrumed at 527 by means of a pair of top flexure springs 528 held by means of a screw 529 on the bracket 523 and is rockable between limits determined by a core 530 of a latch solenoid 531, carried by the bracket 523, and a stop screw 532 carried by a plate 533 also attached by means of the screw 529 to the bracket 523, an end member 534 of the latch 520 being rockable between such limits. The plate 533 also carries a bottom flexure spring 535 which has its upper and free end engaging the lower end of the latch end member 534. When the solenoid 531 is energized, the core 530 attracts the latch end member 534, the upper flexure springs 528 being unflexed and the lower flexure spring 535 being bent back in the position shown in FIG. XI. When the solenoid 531 is deenergized, the lower flexure spring 535 straightens out in opposition to the top flexure springs 528 to remove the latch end 519 from engagement with the intercepted tooth 518.

The solenoids 531 each is energized by the signal through the circuit controlling the indication of a count. Ten possible stopping positions are provided for each of the drums 508 because the readout device indicates in the decimal system of notation. Should some other system of notation be employed, a different number of teeth 518 or a different ratio between the idlers and the drums or both would be used. The present device provides the ten stopping positions for each of the drum members 508 with five teeth 518 on each of the idlers 505 and a two to one gear ratio between the drum members 508 and the idlers 505. The signal controlling the indication of a count is carried through the binary to decimal conversion circuit shown in FIGS. VII and VIII, the set of nine brushes being mounted on each of the support members 513 in a slot 536 and cooperating with the commutator carried on the associated one of the drum members 508 in the same way that the brushes and commutator shown in FIGS. VII and VIII are carried.

The stored kinetic energy of the driven members, i.e., the idlers 505, the drum members 508, and any type wheels and their gears which may be driven by the gears 509 on the sides of the drum members 508, is used as a source of power to move certain parts of the mechanism to disengage the idlers 505 from the power wheels 503. The inertia of the driven members as they are being stopped by the engagement of the ends 519 of the latches 520 with the teeth 518 on the idlers 505 rocks the associated support members 513 about the axis of the stationary shaft 511 in a counterclockwise direction, as viewed in FIG. XI, into the position shown in FIG. XI. Such rocking of the support members 513 in a counterclockwise direction, which is in opposition to return springs 537, one for each of the support members, connected between the upper ends of the support members 513 and a stationary plate 538, is limited by flat headed stop screws 539 one of which contacts each of the drive surfaces 517 of the idlers 505. A bracket 540, attached to the frame 501 by means of a pair of screws 541 one threaded in each of the upstanding frame members 502, carries the plate 538 fixed thereto and also the flat headed stop screws 539. Adjacent each of the stop screws 539 is a cone pointed screw 543 the cone pointed ends of which are arranged to cooperate with the backs of the uppermost ones of the stopped idler teeth 518 as viewed in FIG. XI, i.e., the counterclockwise rotation of the support members 513 moves such ones of the teeth 518 against the cone pointed screws. Lock nuts 544 hold the cone pointed screws in adjusted positions. As in any system having elasticity there is a tendency to rebound when the parts are stopped suddenly. This rebound or backward rotation of the stopped idlers 505 is prevented by the engagement of the stopped idler teeth with the cone pointed stop screws 539. Hence, the support members 513 are rockable about the axis of the stationary shaft 511 between limits determined by the stop screws 539 and 543 which contact the idlers 505 upon counterclockwise rotation of the support members 513 and by the power wheels 503 which drivingly engage the idlers 505 upon clockwise rotation of the support members 513.

Counterclockwise movements of the rockable support members 513 into the position shown in FIG. XI moves a stop surface 545 on each of the rockable support members 513 out of engagement with a stop surface 546 on each of a plurality of latches 547 mounted for rotation on a stationary shaft 548 extending between the upstanding end frame members 502. There is a latch 547 for each of the rockable support members 513, the right hand one of the latches 547 as viewed in FIG. XV being located against a C-ring 549 on the shaft 548 with spacers 550 separating the latches one from the other and a collar 551 on the shaft 548 holding the stack of latches and spacers together. The rockable support members 513 are aligned with the latches 547 by shifting the clamps 514 and 516 (FIG. XIII) on the stationary shaft 511 as hereinbefore described. Movement of the stop surfaces 545 on the rockable support members 513 out of engagement with the stop surfaces 546 on the latches 547 permits springs 552, connected to the latches and to a stationary rod 553 extending between the upstanding end frame members 502, to pivot the latches 547 counterclockwise about the axis of the stationary shaft 548 into the position shown in FIG. XI. In such position, latch surfaces 554 on the latches 547 contact faces 555 on the rockable support members 513 as shown in FIG. XI locking the rockable support members in place while the indicia bearing drums 508 are locked in indicia displaying position.

A cam 556 connected to the power shaft 504 through a one revolution clutch 557 is turned by such shaft 504 whenever a latch finger 558 is removed from its position shown in FIG. XII wherein it is in the path of a stop 559 on the clutch. The latch finger 558 is pivotally mounted on a flexure spring 560 which urges the free end of the finger toward the clutch 557, the flexure spring 560 being secured to a bracket 561 carried by a solenoid 562 carried in turn by a bracket 563 fixed to the left hand one of the upstanding end frame members 502 as viewed in FIG. XIII. Energization of the solenoid 562 withdraws the latch finger 558 from the stop 559 and the cam 556 is turned clockwise as viewed in FIG. XII about the axis of the power shaft 504. Normally open contacts 564, carried on a plate 565 fixed to the left hand one of the upstanding end frame members 502 as viewed in FIG. XIII, when closed by means hereinafter described cause deenergization of the solenoid 562. This occurs before the cam 556 completes its single revolution. Deenergization of the solenoid 562 allows the flexure spring 560 to move the latch finger 558 into the path of the stop 559 as illustrated in FIG. XII stopping the cam 556 after it makes its one revolution. The solenoid 562 is energized when a new reading is to be made by the same signal which energizes the rotary solenoid 241 (FIG. V). Hence, to make a new reading, the solenoid 562 is energized, whereupon the cam 556 is turned one revolution to reset the readout device, the solenoid 562 being deenergized through the closing of contacts 564 before the cam 556 completes its single revolution.

A shaft 566, journaled in the upstanding end frame members 502, has loosely mounted thereon a generally Z-shaped (as viewed in FIG. XIII) cam follower 567. The upper portion of the cam follower 567 as viewed in FIGS. XII and XIII, is bifurcated and carries between the bifurcations a cam following roller 568 and the lower portion of the cam follower 567 carries a contact 569 of normally closed contacts 570. Adjacent the cam follower 567 on the shaft 566 is a driven member 571 which is pinned to the shaft 566 so that it pivots as one therewith and which has three legs, a first one 572 that operates normally open contacts 573 and 564 carried by the plate 565, a second one 574 that carries a contact 575 of normally closed contacts 570, and a third one 576 that is connected to a return spring 577 which is connected in turn to the plate 565. In the home position shown in FIG. XII, a spring 578 urges contacts 569 and 575 together and also urges the cam follower 567 clockwise about the axis of the shaft 566 to urge the cam following roller 568 toward the cam 556 and the return spring 577 pulls the driven member 571 clockwise about the axis of the shaft 566 so that the leg 572 of the member 571 holds the contacts 573 closed. In such home position of the driven member 571, a notch 579 in the leg 576 of the member 571 is located above the free end of a latch finger 580. The latch finger 580 is pivotably mounted by means of a flexure spring 581 mounted on a bracket 582 carried by a check solenoid 583 carried in turn by a right angle bracket 584 fixed to the frame 501, the flexure spring 581 urging the latch finger 580 toward the notch 579. The check solenoid 583 is energized, when the check relay 32 (FIG. I) drops out, releasing a sensing bar 585 (FIG. XI) which mechanically checks as hereinafter described to see if all of the latches 547 are properly positioned before contacts 573 are closed by the leg 572. Closing of contacts 573 initiates a print cycle.

The sensing bar 585 is part of an assembly 586 (FIG. XV) that has two legs 587 which are spaced apart a distance that is about the same as the width of the frame 501 and which are pinned to the shaft 566 to pivot as one therewith, the sensing bar 585 extending nearly the distance between the end frame members 502 adjacent faces 588 (FIG. XI) to be sensed on the latches 547. The assembly 586 also includes a knock-out bar 589 which is parallel to and the same length as the sensing bar 585 and an arm 590 which rises above the left one of the legs 587 as viewed in FIG. XV, the knock-out bar 589 extending nearly the distance between the end frame members 502 adjacent faces 591 (FIG. XI) on the latches 547.

When a new reading is to be made, the solenoid 562 is energized whereupon the cam 556 is turned one revolution as hereinbefore described. A rise A on the cam 556, which is turned in the direction indicated by the arrow in FIG. XII, drives the cam following roller 568 and the cam follower 567 counterclockwise about the axis of the shaft 566, the cam follower being loosely pivoted on the shaft 566 so as not to drive the shaft. As soon as the cam follower 567 begins to move it moves contact 569 away from contact 575 in opposition to spring 578. Opening of such contacts deenergizes the latch solenoids 531 to remove the latch ends 519 from contact with the intercepted teeth 518 as hereinbefore described. An instant later, the cam follower 567 contacts a short pin 592 carried by the leg 576 of the driven member 571 and drives the driven member counterclockwise, as viewed in FIG. XII, in opposition to the return spring 577 about the axis of the shaft 566, the shaft 566 being driven in turn by the driven member 571 because the driven member is fixed thereto. Counterclockwise movement of the driven member 571 continues until point B on the leg 576 of the driven member reaches a position about opposite to the free end of the latch finger 580. During such counterclockwise movement, contact 575 follows after contact 569 but fails to catch up with it. As soon as the driven member 571 begins to move, its arm 572 allows contacts 573 to open and before the cam following roller 568 drops off of the cam 556 at point C on the cam contacts 564 are closed by the arm 572 to deenergize solenoid 562 as hereinbefore described. Opening of contacts 573 breaks the circuit to the printer. When the cam following roller 568 drops off of the cam 556 at point C on the cam, return spring 577 pivots the driven member 571 clockwise about the axis of the shaft 566 until the free end of the latch finger 580 catches in the notch 579 in the leg 576 of the driven member 571. This prevents the leg 572 of the driven member 571 from closing contacts 573 maintaining the printer disabled, but does not prevent return spring 578 from closing contacts 570 to reapply power to the latch solenoids 531, it being understood that the latch solenoids 531 are energized only when two conditions are present, i.e., contacts 570 must be closed and the signal from the binary to decimal converter circuit 36 must call for a readout. The mechanism shown in FIG. XII then is back to its home position as shown in FIG. XII, except that latch finger 580 is caught in notch 579 to hold contacts 573 in the print circuit open. Hence, driven member 571 and the shaft 566 to which it is secured have three positions, namely, No. 1 position shown in FIG. XII wherein the notch 579 is above and therefore free of the latch 580, No. 2 position wherein the latch 580 is caught in the notch 579, and No. 3 position wherein point B on the leg 576 of the driven member 571 is about opposite the free end of the latch 580.

In the No. 1 position of the driven member 571 and the shaft 566, the knock-out bar 589 and the sensing bar 585 are positioned as shown in FIG. XI, the bars 589 and 585 moving as one with the shaft 566. When a new reading is to be made and the cam 556 is turned one revolution, the knock-out bar 589 is moved from the No. 1 position shown in FIG. XI to the right, i.e., clockwise about the axis of the shaft 566 as viewed in FIG. XI, contacting the four faces 591 of the four latches 547 and thus driving the latches clockwise about the axis of the stationary shaft 548 in opposition to the return springs 552. This moves the latch surfaces 554 out from underneath the faces 555 on the four rockable support members 513. Immediately, the latch solenoids 531 being deenergized with the latch ends 519 out of the path of the idler teeth 518, the four springs 537 pivot the rockable support members 513 about the axis of the stationary shaft 511 until the drive surfaces 517 of the idlers 505 contact the power wheels 503, whereby all of the drum members 508 are simultaneously started and continue in motion until they are each again stopped and locked in indicating positions. The sensing bar 585 moves to the right as one with the knock-bar 589, the sensing bar 585 doing nothing at this time.

The sensing bar 585 and the knock-out bar 589 continue moving to the right as viewed in FIG. XI until the driven member 571 and the shaft 566 are in the No. 3 position and then move to the left until the driven member 571 and the shaft 566 are in the No. 2 position. In the No. 2 position, i.e., the position wherein the latch 580 (FIG. XII) is caught in the notch 579 of the leg 576 of the driven member 571, the sensing bar 585 is held under the influence of such latch 580 from possible contact with any parts of the latches 547 (FIG. XI) and the knock-bar 589 is back to about its position shown in FIG. XI wherein it cannot contact any parts of the latches 547, permitting the latches 547 to be pivoted by their return springs 552 counterclockwise about the axis of the stationary shaft 548 until stop surfaces 546 on the latches 547 contact stop surfaces 545 on the rockable support members 513.

When the drums 508 are stopped in indicating positions by the interception of the teeth 518 by the ends 519 of the latches 520 and the stop surfaces 545 on the rockable support members 513 are moved out of engagement with the stop surfaces 546 on the latches 547, the return springs 552 pivot the latches 547 counterclockwise about the axis of the stationary shaft 548 into the position shown in FIG. XI and as hereinbefore described. In such position, latch surfaces 554 on the latches 547 contact faces 555 on the rockable support members 513 as shown in FIG. XI locking the rockable support members 513 in place while the indicia bearing drums 508 are locked in indicia displaying position as hereinbefore described. It is possible, however, for some reason or other, that the latches 547 will not latch up properly. If the latches 547 are not positioned properly, it is not desirable to make a print. If the latches 547 are not latched up properly, the stop surfaces 545 on the rockable support members 513 by engagement with the stop surfaces 546 on the latches 547 prevent the latches 547 from moving into their position shown in FIG. XI and position the faces 588 on the latches 547 in the path of the sensing bar 585.

When the check relay 32 (FIG. I) drops out whereupon the check solenoid 583 (FIG. XII) is energized, the latch 580 is attracted to the check solenoid 583 in opposition to the flexure spring 581 removing the free end of the latch 580 from the notch 579 in the leg 576 of the driven member 571. If the latches 547 are properly latched up as shown in FIG. XI, removal of the latch 580 from the notch 579 permits the return spring 577 to move the driven member 571 from its No. 2 position to its No. 1 position which is the home position shown in FIG. XII whereupon the leg 572 of the driven member 571 closes contacts 573 initiating the print cycle. If one or more of the latches 547, however, are not properly latched up, one or more of the latch faces 588 will be in the path of the sensing bar 585 as it attempts to move from the No. 2 position to the No. 1 position. This prevents the leg 572 of the driven member 571 which moves as one with the sensing bar 585 from closing contacts 573 and no print can be made. Hence, when the check relay 32 drops out, the check solenoid 583 is energized releasing the sensing bar 585 which homes if all of the latches 547 are properly positioned operating contacts 573 initiating the print cycle. The sensing bar 585 mechanically senses the latches 547 and initiates the succeeding cycle only if all of the indicia bearing members 508 are properly latched. This prevents a print from being made when the printing type bearing wheels are not properly positioned because of a malfunction in the readout device, the readout device setting up such type bearing wheels by means of the gears 509 which turn as one with the drums 508.

Ordinarily, when the latch solenoids 531 are deenergized, the flexure springs 535 straighten out to remove the latch ends 519 from engagement with the intercepted teeth 518 as hereinbefore described. However, it may happen that one of the latch ends 519 will hang up on an intercepted tooth 518 and its flexure springs 535 cannot move it clear of the tooth. To prevent this from happening, a pivotably mounted finger 593 is provided for each of the latch ends 519 which fingers 593 are rocked about the axes of cone pointed screws 594 (FIG. XIV) in the end frame members 502 every time that a new reading is to be made and, if any of the latch ends 519 are stuck, drivingly contact tips 595 of such stuck latch ends and thus free such stuck latch ends. The fingers 593 are carried on a bar 596 which is pivoted on the tips of the cone pointed screws 594 and which carries a pin 597 that extends through an oblong hole 598 having a back surface 599 and a front surface 600. When the drums 508 are locked in indicating position as shown in FIG. XI, a return spring 601, connected at its one end to a plate 602 which is attached to plate 540 and which defines the hole 598, fixed to the top of the pin 597 pulls the pin 597 against the back surface 599 of the oblong hole 598 keeping the bar 596 which carries the pin 597 and the fingers 593 also carried by the bar 596 in their positions shown in FIG. XI wherein the fingers 593 are out of contact with the tips 595 of the latch ends 519.

When a new reading is made, the fingers 593 are rocked counterclockwise as viewed in FIG. XI about the axes of the cone pointed screws 594 contacting and driving those, if any, of the latches 520 which happen to be stuck out of engagement with the intercepted ones of the idler teeth 518. The fingers 593 are rocked in such counterclockwise direction by means which includes a rod 603 that extends through a hole in an ear 604 atop the arm 590 of the sensing bar and knock-out bar assembly 586 and through a hole in a finger 605 carried by the bar 596. The finger 605 resembles the fingers 593 carried by the bar 596, except, as shown in FIG. XI, the finger 605 is offset relative to the other fingers 593. A collar 606 is carried near the right hand end of the rod 603, as viewed in FIG. XI, a collar 607 is carried by the rod 603 intermediate its ends, and a collar 608 is carried by the rod 603 at its left hand end, the collars 606, 607 and 608 being fixed to the rod 603. A coil spring 609 surrounds the rod 603 and is compressed between the collar 606 and the ear 604 atop the arm 590, the ear 604 bearing against the collar 607 when the mechanism is latched up in readout position as shown in FIG. XI. The right hand end of the collar 608 as viewed in FIG. XI is rounded to rock during operation on the finger 605.

In operation, when a new reading is made, the arm 590 of the sensing bar and knock-out bar assembly 586 is pivoted clockwise about the axis of the shaft 566 as hereinbefore described. The ear 604 of the arm 590 pushes against the coil spring 609 carrying the rod 603 to the right as viewed in FIG. XI and pivoting the bar 596, operatively connected to the rod 603, counterclockwise about the axes of the cone pointed screws 594 whereupon the fingers 593 carried by the bar 596 are rocked counterclockwise about the axes of the cone pointed screws 594 contacting and driving those, if any, of the latches 520 which happen to be stuck out of engagement with the intercepted ones of the idler teeth 518. The rod 603 is driven to the right until the pin 597 carried by the bar 596 is stopped by engagement with the front surface 600 of the hole 598 in the plate 602. This extends the return spring 601. Further movement of the ear 604 of the arm 590 to the right compresses the coil spring 609 between the ear 604 and the collar 606 on the rod 603. Return movement of the ear 604 on the arm 590 is aided by the coil spring 609, the ear 604 moving relative to the rod 603 until its engages the collar 607 fixed on the rod 603 whereupon the ear 604 and the rod 603 move as one to their home positions. Movement of the rod 603 to the left permits the return spring 601 to pivot the bar 596 clockwise about the axes of the cone pointed screws 594 until the pin 597 carried by the bar 596 engages the back surface 599 of the hole 598 in the plate 602. This moves the fingers 593 carried by the bar 596 to positions wherein they cannot engage the latches 520 as shown in FIG. XI.

A second numerical display device may be located adjacent the foregoing described device to the right of the device as viewed in FIG. XIV. In this arrangement, the drive shaft 504 is extended and is used in the second device in the same way that it is used in the first device.

In conclusion it is pointed out that while the illustrated example constitutes a practical embodiment of our invention, we do not limit ourselves to the exact details shown, since modification of the same may be undertaken without departing from the spirit of this invention.

Having described the invention, we claim:

1. In combination, a condition responsive system adapted to generate an encoded electrical signal which is a function of a condition being measured, translating means for decoding the signal and including a plurality of movable members and latch means for latching the members in read out positions, and circuit means responsive to electrical operation of the system and to the position of the movable members being in coincidence with said signal for generating an output signal, the translating means further including means responsive to the output signal for mechanically sensing the latch means and initiating a succeeding cycle provided all the members are correctly latched in their read out positions.

2. In combination, a condition responsive device adapted to generate a series of electrical pulses proportional in number to a condition being measured, Bistable circuit means, electronic counter means, circuit means applying at least one of the pulses to the Bistable circuit means and the series of pulses to the electronic counter means, readout means for reading out the counter and including a plurality of movable indicia bearing members and latch means for latching the members in read out positions, means responsive to coincidence of the count in the counter and the read out positions of the members for generating a check signal, and output circuit means responsive to coincidence of an output from the Bistable circuit means and the check signal for generating an output signal, the read out means further including means responsive to the output signal for mechanically checking the latch means and initiating a succeeding cycle provided all the indicia bearing members are correctly latched in their read out positions.

3. In combination, a condition responsive device adapted to generate a series of electrical pulses proportional in number to a condition being measured, Bistable circuit means, electronic counter means, circuit means applying at least one of the pulses to the Bistable circuit means and the series of pulses to the electronic counter means, read out means for converting the count in the counter to a decimal read out and including a plurality of movable members and latch means for latching the members in read out positions, means responsive to coincidence of the count in the counter and the read out positions of the members for generating a check signal, and output circuit means responsive to coincidence of an output from the Bistable circuit means and the check signal for generating an output signal.

4. In a weighing scale system, in combination, circuit means for accumulating weight information relating to a load being weighed, a rotatable member, means for rotating the member, means for stopping the member as it approaches a read out position corresponding to the information, latch means for latching the member in the read out position, and mechanical check means for mechanically sensing the latch means to check whether or not the member is correctly latched in the read out position and for initiating a succeeding cycle provided the member is correctly signal latched.

5. In a weighing scale system according to claim 4 wherein electrical check means are provided responsive to coincidence of the information and the read out position of the member for generating a check signal to which the mechanical check means is responsive.

6. In a weighing scale system according to claim 5 wherein there are provided electrical check means responsive to coincidence of the information and the read out position of the member for generating a check signal, Bistable circuit means responsive to operation of the weighing scale system, and output circuit means responsive to coincidence of an output from the Bistable circuit means and the electrical check means for generating an output signal to which the mechanical check means is responsive.

7. In a weighing scale system, in combination, circuit means for storing weight information relating to a load being weighed, a rotatable member having a plurality of read out positions, means for rotating the member, means responsive to coincidence of the weight information in the circuit means and the position of the member for stopping the member in read out position and also for simultaneously generating a check signal at coincidence, and logic circuit means connected to receive said check signal for generating a succeeding signal.

References Cited by the Examiner

UNITED STATES PATENTS

| | | | |
|---|---|---|---|
| 2,234,263 | 3/1941 | Lake et al. | 197—20 |
| 2,315,723 | 4/1943 | Mills et al. | 197—20 |
| 2,343,398 | 3/1944 | Bryce | 101—93 |
| 2,406,835 | 9/1946 | Herbst | 340—146.1 |
| 2,948,465 | 8/1960 | Allen | 177—13 X |
| 2,998,596 | 8/1961 | Murphy | 340—324 |
| 3,199,097 | 8/1965 | Hartley | 340—149 X |

NEIL C. READ, *Primary Examiner.*

P. XIARHOS, D. YUSKO, *Assistant Examiners.*

UNITED STATES PATENT OFFICE
CERTIFICATE OF CORRECTION

Patent No. 3,312,939 April 4, 1967

Robert E. Bell et al.

It is hereby certified that error appears in the above numbered patent requiring correction and that the said Letters Patent should read as corrected below.

Column 3, line 69, for "Fip" read -- Flip --; column 12, line 55, for "336" read -- 366 --; column 15, line 19, for "electrode" read -- electronic --; column 16, line 62, for "tthe" read -- the --; column 28, line 18, strike out "signal"; line 24, for the claim reference numeral "5" read -- 4 --.

Signed and sealed this 7th day of November 1967.

(SEAL)
Attest:

Edward M. Fletcher, Jr.
Attesting Officer

EDWARD J. BRENNER
Commissioner of Patents